US008340714B2

(12) United States Patent
Hassan et al.

(10) Patent No.: US 8,340,714 B2
(45) Date of Patent: Dec. 25, 2012

(54) COMPUTING DEVICE WITH CONFIGURABLE ANTENNA

(75) Inventors: Amer A. Hassan, Kirkland, WA (US);
Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 11/956,500

(22) Filed: Dec. 14, 2007

(65) Prior Publication Data
US 2009/0156191 A1    Jun. 18, 2009

(51) Int. Cl.
*H04M 1/00* (2006.01)
(52) U.S. Cl. ............... 455/552.1; 455/553.1; 455/101; 455/121; 455/123; 455/124; 455/125; 455/193.1; 455/193.2; 455/193.3; 455/561; 455/562.1; 343/729
(58) Field of Classification Search .......... 455/78–83, 455/552.1, 553.1, 561, 562.1, 101, 121, 123–125, 455/193.1–193.3, 280–282, 334; 343/820–823, 343/850–853, 860–861, 724, 725, 729; 375/219
See application file for complete search history.

(56) References Cited

U.S. PATENT DOCUMENTS

| 6,300,909 | B1 | 10/2001 | Tsubaki et al. |
| 6,961,368 | B2 * | 11/2005 | Dent et al. ................ 375/219 |
| 7,043,023 | B2 | 5/2006 | Watanabe et al. |
| 7,151,925 | B2 | 12/2006 | Ting et al. |
| 7,454,227 | B2 * | 11/2008 | Kitaji ........................ 455/522 |
| 7,663,555 | B2 * | 2/2010 | Caimi et al. ................ 343/702 |
| 7,761,061 | B2 * | 7/2010 | Rofougaran et al. .......... 455/80 |
| 7,784,029 | B2 | 8/2010 | Hassan et al. |
| 7,831,219 | B2 * | 11/2010 | Heuermann et al. .......... 455/107 |
| 8,036,240 | B2 | 10/2011 | Hassan et al. |
| 2003/0142022 | A1 | 7/2003 | Ollikainen et al. |
| 2004/0029575 | A1 | 2/2004 | Mehta |
| 2005/0027789 | A1 | 2/2005 | Luo et al. |
| 2005/0055689 | A1 | 3/2005 | Abfalter et al. |
| 2005/0059427 | A1 | 3/2005 | Wallace |
| 2005/0075081 | A1 | 4/2005 | Catreux-Erceg et al. |
| 2005/0243952 | A1 | 11/2005 | Li |

(Continued)

FOREIGN PATENT DOCUMENTS
CN             1578175 A        2/2005
(Continued)

OTHER PUBLICATIONS

Youngblood, G., "A Software-Defined Radio for the Masses, Part 1," http://www.ece.jhu.edu/~cooper/SWRadio/Yblood1.pdf, Jul./Aug. 2002, pp. 1-9.

(Continued)

*Primary Examiner* — Tuan A Tran
(74) *Attorney, Agent, or Firm* — Chin IP, PLLC; Davin Chin

(57) ABSTRACT

A computing device with a configurable antenna. The antenna is configured through a switching circuit operating under software control. Operating characteristics of the antenna are configured based on connections between conducting segments established by the switching circuit, allowing the nominal frequency, bandwidth or other characteristics of the antenna to be configured. Because the switching is software controlled, the configurable antenna may be integrated with a software defined radio. The radio and antenna can be reconfigured to support communication according to different wireless technologies at different times or to interleave packets according to different wireless technologies to support concurrent sessions using different wireless technologies.

19 Claims, 11 Drawing Sheets

U.S. PATENT DOCUMENTS

| | | | |
|---|---|---|---|
| 2006/0046716 A1 | 3/2006 | Hofstaedter et al. |
| 2006/0130053 A1 | 6/2006 | Buljore et al. |
| 2006/0154691 A1 | 7/2006 | Tang et al. |
| 2006/0193295 A1 | 8/2006 | White et al. |
| 2006/0211387 A1 | 9/2006 | Pisek et al. |
| 2006/0282497 A1 | 12/2006 | Braun et al. |
| 2006/0287001 A1 | 12/2006 | Budampati et al. |
| 2007/0078924 A1 | 4/2007 | Hassan et al. |
| 2008/0129639 A1 | 6/2008 | Mitsugi |

FOREIGN PATENT DOCUMENTS

| | | |
|---|---|---|
| CN | 1599275 A | 3/2005 |
| CN | 1913352 A | 2/2007 |
| JP | 2001-168634 A | 6/2001 |
| KR | 10-2005-0066476 A | 6/2005 |
| KR | 10-20050066476 | 6/2005 |
| KR | 10-2006-0104330 A | 10/2006 |
| KR | 10-20060104330 | 10/2006 |
| WO | WO 2004/057505 A1 | 7/2004 |
| WO | WO 2005-109569 A1 | 11/2005 |

OTHER PUBLICATIONS

"Software Defined Radio", http://www.altera.com/end-markets/wireless/software/sdr/wir-sdr.html, 4 pgs.

"Software Defined Radio," http://www.altera.com/end-markets/wireless/software/sdr/wir-sdr.html, 1pg.

"Software Defined Radio," http://www.wipro.com/webpages/insights/softwareradio.htm, 1 pg.

International Search Report and Written Opinion dated Jul. 9, 2009, from corresponding International Application No. PCT/US2008/083527.

International Search Report and Written Opinion dated Jul. 9, 2009 for PCT/US2008/083527.

International Search Report dated Jul. 9, 2009 from PCT/US2008/083527.

B. Becciolini, "Impedance Matching Networks Applied to RF Power Transistors", Freescale Semiconductor, Inc, 2005, Doc. No. AN721, Rev. 1, Oct. 2005, pp. 1-16.

Lin, V.S. et al, "Implementation of Reconfigurable Software Radio for Multiple Wireless Standards," 2004 IEEE Aerospace Conference Proceedings, pp. 1392-1397.

"Green Hills Platform for Software Defined Radio," Green Hills Software Inc.

"Software-Defined Radio, White Paper" Wipro Technologies, Aug. 2002, pp. 1-10.

International Search Report and Written Opinion from PCT/US2008/062332 dated Sep. 26, 2008.

Office Action for Chinese Application No. 200880015240.1, dated Feb. 18, 2011.

Office Action, issued in CN App. No. 200880121302.7; Date of Dispatch: Sept. 29, 2012; 10 pages, including partial translation.

* cited by examiner

COMPUTING DEVICE WITH CONFIGURABLE ANTENNA

BACKGROUND

Many computing devices are equipped with hardware that allows the computing device to wirelessly connect to a network or to other computing devices. Such wireless hardware frequently contains one or more radios, each with a transmitter, a receiver and data processing components.

In some devices, the wireless hardware has a predefined configuration such that each radio supports a connection according to a specific wireless technology, such as Wi-Fi, WiMAX, Bluetooth or HSDPA. For example, such a radio may communicate using a predefined frequency or frequencies and use a predefined sequence of control messages to connect with another device or exchange information. To support communication with different devices communicating using different wireless technologies, the wireless hardware may include multiple radios, each configured for communication using a specific wireless technology. Each radio may be coupled to its own antenna, frequently implemented as a patch antenna on a surface of a printed circuit board on which the radio is implemented or embedded within the shell of the computer. Though some radios may support a number of closely related wireless technologies, such as variations of the 802.11 Standard, a radio with a predefined configuration is generally limited in the wireless technologies it can support.

In other devices, the wireless hardware may be configurable such that the wireless technology used for communication may change under software control, implementing what is sometimes called a "software defined radio." The wireless hardware is adapted to receive control inputs that can change operating parameters of the radio, such as the frequencies used for communication or data processing performed on received signals. By reconfiguring the operating parameters of the hardware, it may be possible for one group of hardware components to act as a radio for different wireless technologies.

SUMMARY OF INVENTION

A computing device may be equipped with a programmable antenna that can be configured under program control to support more effective communication. The antenna may be implemented with switching circuitry that, at any time, selects one or more elements from a collection of available elements. Each selected element, itself, may create the antenna aperture or may be one segment of the antenna aperture.

An antenna according to embodiments of the invention may be used in connection with a software defined radio that may be configured to operate, at different times or concurrently, using different wireless technologies that operate over different frequency ranges or have different bandwidths.

In some embodiments, a software defined radio may have an architecture with a separate control plane and a data plane. The data plane performs data processing operations associated with wireless communication. The control plane can change the configuration of the data plane to change the wireless technology for which the radio operates or to adjust operating parameters without changing wireless technology. The antenna elements may be connected in the data plane for transmitting or receiving signals. The control plane may select an appropriate antenna configuration based on programming of the radio. A selection may be made at any desired rate, which may be as frequently as once for each packet, allowing a single configurable antenna to support concurrent communications using wireless technologies with different nominal frequencies or having different bandwidths.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a computing device may more efficiently communicate wirelessly if the computing device is equipped with an antenna that can be configured based on one or more control inputs. Such an antenna may be sensitive to signals transmitted or received having a particular nominal frequency or bandwidth. Changing the control inputs may change the nominal frequency, bandwidth or other parameters associated with operation of the antenna.

The control inputs may be generated to coordinate configuration of the antenna with operation of a software defined radio, and in some embodiments the software defined radio may generate the control inputs that configure the antenna. The control inputs may be generated to ensure that, at any given time, the antenna is sensitive to signals having a frequency and bandwidth matching the signals being transmitted or received by the software defined radio at that time. Accordingly, wireless communication may be particularly effective if the configurable antenna is used in conjunction with a software defined radio.

According to embodiments of the invention, a software defined radio for a computing device is implemented with an architecture that allows easy configuration and reconfiguration in multiple scenarios. An example of an environment in which such a software defined radio may be employed is provided by FIG. 1.

Figure 1:
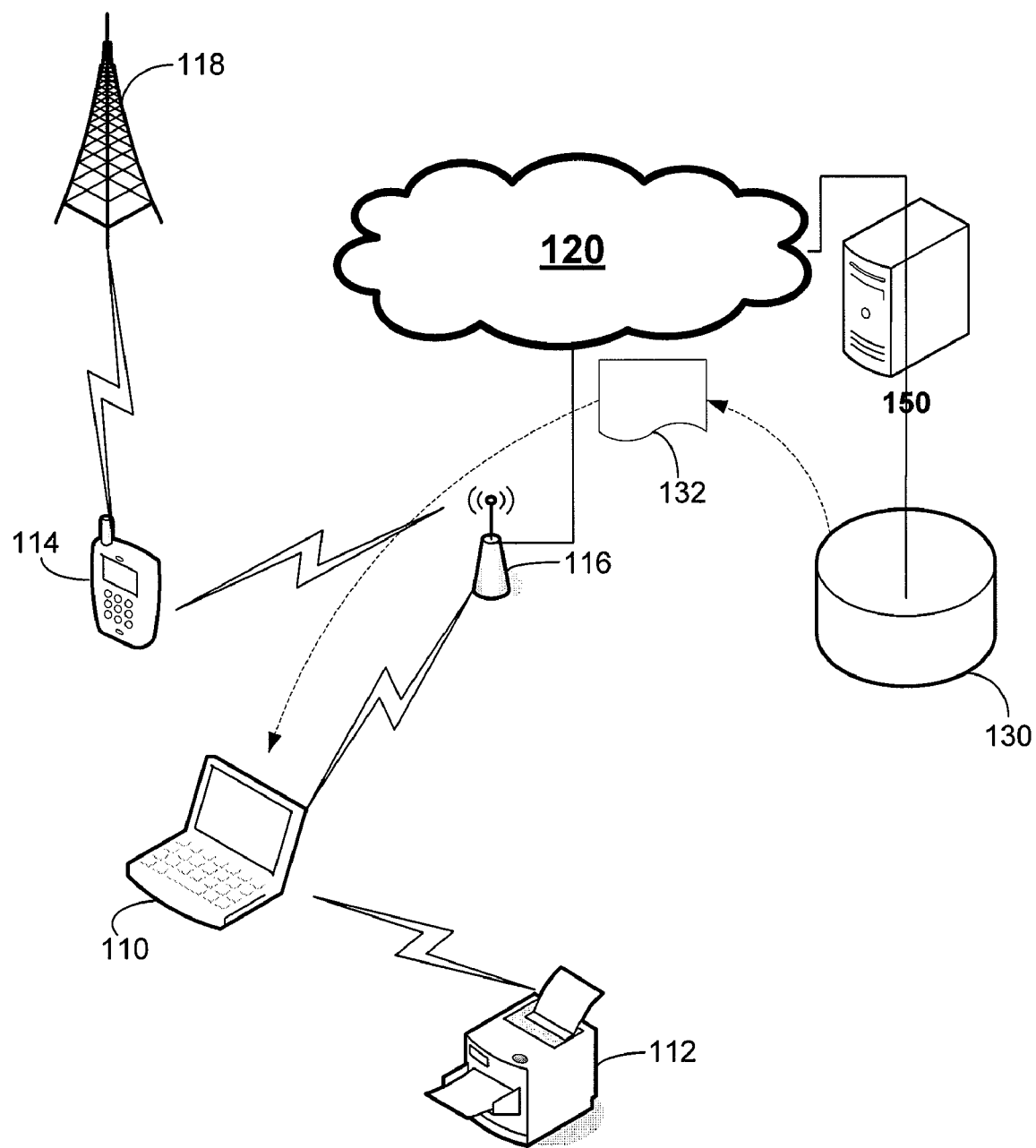
FIG. 1 is a sketch of a computing environment including a computing device with a software defined radio according to an embodiment of the invention.

FIG. 1 illustrates a networked computing environment in which multiple computing devices interact. One or more of the computing devices may contain a software defined radio according to embodiments of the invention. In the example illustrated, three computing devices communicating wirelessly as shown: laptop 110, printer 112, and Smartphone 114. Though three computing devices are illustrated, any number or type of computing devices may employ a software defined radio according to embodiments of the invention and three devices are illustrated for simplicity.

In this example, laptop computer 110 communicates wirelessly with an access point 116. Through access point 116, laptop computer 110 may gain access to network 120 and one or more devices connected to network 120. As an example of the types of devices that laptop computer 110 can access through network 120, FIG. 1 shows a server 150. In this example, server 150 may be a group policy server. As is known in the art, a group policy server may be configured to provide management information to clients that are domain joined. A group policy server provides a mechanism for a network administrator to provide policy information to the domain joined clients. Such servers may be used in enterprise networks to allow a network administrator to configure or otherwise manage network clients. Network clients, such as laptop computer 110, may be configured with an agent that, upon connection to network 120, accesses group policy server 150 to obtain or update group policy information.

Group policy server 150 may maintain group policy information in any suitable fashion. In the example of FIG. 1, group policy information may be maintained in database 130. Database 130 may represent any suitable computer storage media accessible by group policy server 150. In the example of FIG. 1, database 130 may contain group policy information as is known in the art. Alternatively or additionally, database 130 may contain information useful for configuring a software defined radio within laptop computer 110. For example, database 130 may contain one or more wireless technology specifications that, when downloaded to laptop computer 110 and applied to a software defined radio within laptop computer 110, configure the software defined radio for communications according to a specific wireless technology.

For example, FIG. 1 illustrates a wireless technology specification 132 being downloaded from database 130 through server 150 to laptop computer 110. The downloaded wireless technology specification 132 may configure the software defined radio within laptop computer 110 to communicate according to any suitable wireless technology. Wireless technology specifications downloaded to laptop computer 110 may be applied to a software defined radio sequentially or in parallel to change the function of a software defined radio within laptop computer 110 to support different wireless technology at different times or to support multiple wireless technologies concurrently.

For example, in FIG. 1 laptop computer 110 is communicating wirelessly with access point 116. Such communications with an access point for an infrastructure network are frequently performed using a wireless technology according to the 802.11 protocol. However, a user of laptop computer 110 may wish to access devices that are not connected to the infrastructure network 120, such as printer 112. Printer 112 may not support communication according to the same wireless technology as access point 116. Frequently, devices such as printer 112 are configured for communications using an ad hoc network and may use a wireless technology such as Bluetooth. Accordingly, wireless technology specification 132 may be applied to the software defined radio within laptop computer 110 to configure the radio to additionally communicate with printer 112 using a different wireless technology than used for communication through access point 116.

Printer 112 may also include a software defined radio that may similarly be configured for communications with a laptop computer 110. Though, it is not necessary that devices with software defined radios communicate only with other devices with software defined radios and a radio in printer 112 may be implemented in any suitable way.

Other computing devices may, like laptop 110, include a software defined radio that may be configured through the application of a wireless technology specification. For example, Smartphone 114 is shown communicating wirelessly with access point 116. As described above, communication with access point 116 may be in accordance with a wireless technology, such as an 802.11 protocol. Smartphone 114 may alternatively communicate with a general packet radio service (GPRS) network 118 using a different wireless technology. To support communications using two wireless technologies as illustrated in FIG. 1, Smartphone 114 may be equipped with a software defined radio that is programmed with multiple wireless technology specifications simultaneously.

Each computing device programmed with wireless technology specifications may obtain those wireless technology specifications in any suitable way. FIG. 1 shows as an example that a wireless technology specification may be obtained by a computing device through group policy server 150. More generally, a wireless technology specification may be obtained on a transportable computer storage media (such as a CD), obtained from any suitable server or obtained from any other suitable source.

As one example of the flexibility provided by this capability, a wireless device may download a wireless technology specification over the Internet or other publicly available network. An operator of a server reachable through the Internet may provide wireless technology specifications for a fee or other commercial consideration. For example, an operator of GPRS network 118 may provide wireless technology specifications allowing computing devices to access GPRS network 118. If access to GPRS network 118 is provided only to users who subscribe to the network service for a fee, the operator of GPRS network 118 receives a commercial benefit by enabling more users to access GPRS network 118 and therefore subscribe to the services provided through GPRS network 118.

As another example, a business or other entity may operate a website through which users of computing devices with software defined radios may purchase or license for a period of time a wireless technology specification enabling communications according to specific wireless technologies. This capability could be useful, for example, to a computer user preparing to travel to a foreign country where a wireless technology for which that user's computer is not configured is in widespread use. Prior to traveling to that foreign country, the computer user may wish to download a wireless technology specification so that the user may communicate wirelessly with networks or other devices in that foreign country. In this scenario, the wireless technology specification may be supplied by a business for a fee. Alternatively or additionally, the wireless technology specification may be provided in conjunction with a subscription to a wireless network in the foreign country, which may entail payment of a fee. In this way, a user of a computing device equipped with the software defined radio may greatly benefit from the expanded geographic area over which their computing device may communicate wirelessly. The same benefit may be achieved even if the networks accessed using a downloaded wireless technology specification are not in a foreign country. Accordingly, in embodiments of the invention, a wireless technology specification may be downloaded from any suitable server or obtained from any other data source for use in communicating with any suitable wireless devices in any suitable locations.

Figure 2:
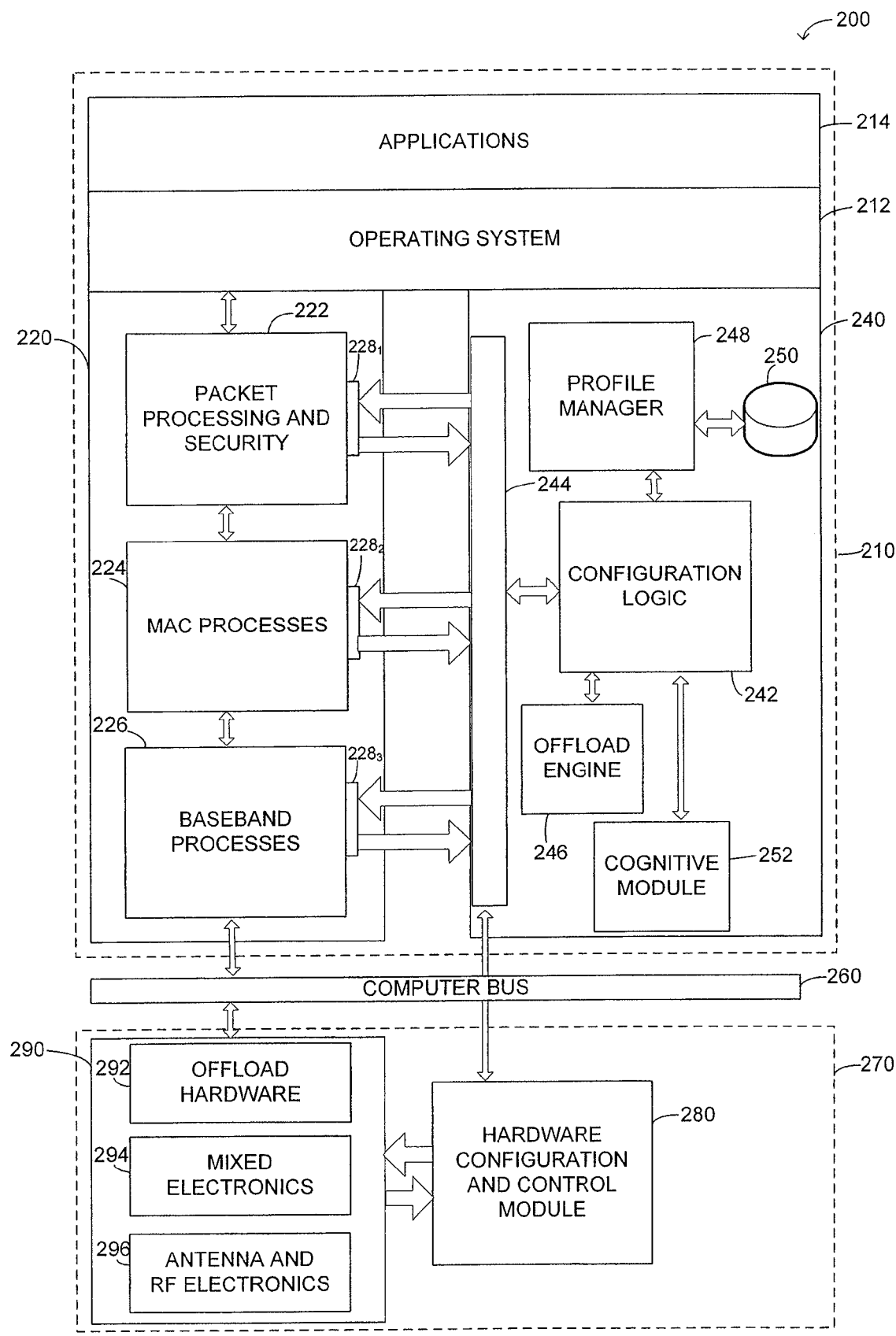
FIG. 2 is a block diagram of components within a computing device containing a software defined radio according to embodiments of the invention.

FIG. 2 illustrates an architecture of computing device 200 with a software defined radio that may be readily configured using a wireless technology specification, such as wireless technology specification 132 (FIG. 1). Such a computing device may be implemented using any suitable hardware. However, in the example of FIG. 2, computing device 200 includes a processor 210 coupled to a computer bus 260. Computer bus 260, for example, may be a PCI bus. However, any suitable bus may be used within computing device 200. Over computer bus 260, processor 210 may communicate with one or more other hardware components. In the example of FIG. 2, a radio card 270 is illustrated.

Processor 210 may be any suitable processor or processors and each processor may have one or multiple cores. However, for simplicity a single processor 210 is illustrated. Likewise, hardware components used in implementing a software defined radio may be packaged in any suitable way. For example, hardware components implementing a software defined radio may be implemented on a separate wireless network interface card or may be incorporated with hardware components performing other functions within computing device 200. As a further example of a possible variation, hardware components for implementing a software defined radio may be spread across multiple cards connected to computer bus 260. Accordingly, FIG. 2 shows an example embodiment in which a single radio card 270 incorporates all of the hardware components for a software defined radio, but any suitable packaging of the hardware components may be employed.

FIG. 2 also illustrates software components that may execute within computing device 200. In the embodiment illustrated, the software components may be stored as computer executable instructions and configuration parameters in computer storage media associated with processor 210. The software components may be configured in any suitable way. In the embodiment illustrated, the software components include an operating system 212. Operating system 212 may be a computer operating system as is known in the art, though any suitable operating system may be used. Operating system 212 may provide multiple functions accessed by applications 214 executing on computing device 200. The number and type of application components 214 may depend on the type and function of computing device 200. However, examples of applications 214 may include a web browser, email application or other applications that may generate or consume data that is transmitted or received wirelessly using a software defined radio.

Operating system 212 may provide an interface between applications 214 and the software defined radio. The operating system 212 may also provide higher level network functions than are provided by a radio. For example, a radio may provide network functions at levels 1 through 3 of the OSI layered network model. Operating system 212 may provide support for functions at higher network layers. In this scenario, the operating system may support connections between applications 214 and applications in other computing devices. For example, applications frequently communicate using a TCP protocol or other connection-based protocols. Operating system 212 may contain components that establish and maintain connections with applications in other devices, though relying on the software defined radio to physically convey data for that connection to the other device.

Such partitioning of functions between an operating system and a radio is known in the art, whether or not a software defined radio is employed. Accordingly, the specific partitioning of communication functions between operating system 212 and software defined radio within computing device 200 is not critical to the invention.

In the example of FIG. 2, a software defined radio is implemented with software components segregated into a data plane 220 and a control plane 240. Data or control messages related to specific wireless technologies generated by an application 214 or operating system 212 for transmission wirelessly passes through data plane 220 before it is applied to radio card 270 for transmission. The specific processing performed by the components within data plane 220 may be defined and configured by components within control plane 240. Data or control messages related to specific wireless technologies received wirelessly on radio card 270 may be passed through components of data plane 220 on its way to operating system 212 or to applications 214. The processing within data plane 220 performed on received data may likewise be defined and configured by components within control plane 240.

In the embodiment illustrated, the hardware components on radio card 270 may likewise be segregated into a control plane and a data plane. In the embodiment illustrated, data plane 290 is illustrated as containing multiple components. A hardware control plane within radio card 270 is implemented in a single module 280. However, the number and types of modules within each of the control and data planes are not critical to the invention.

In the embodiment illustrated, software data plane 220 includes a packet processing and security module 222, a media access control module (MAC) 224 and baseband processes module 226. The specific functions performed within each of these modules may depend on the configuration of the software defined radio. However, packet processing and security module 222, when processing for data to be transmitted, may receive the data from operating system 212 and format the data into packets in accordance with any protocols used by the wireless technology for which the software defined radio is configured to implement. As part of forming packets, packet processing module 222 may perform a packet level encryption, apply a signature to a packet for authentication or perform other security functions for the data to be transmitted wirelessly.

Components within MAC processes module 224 may perform one or more MAC functions as appropriate for the wireless technology for which the software defined radio is configured. For example, components within MAC processes module 224 may establish a channel over which computing device 200 may wirelessly communicate with another wireless device, determine when data may be transmitted over that channel or specific frequencies to be used for communication over that channel.

In addition to other functions, when processing data to be transmitted, components within MAC processes module 224 may receive packets defined within packet processing and security module 222 and convert each packet into a stream of source bits for transmission.

Those source bits may be provided to components within baseband processes module 226 for further processing and ultimately for application to hardware components on radio card 270 for wireless transmission. For example, a component within baseband processes module 226 may encode the source bits using a forward error correction algorithm. Another component may digitally modulate the encoded bit stream, such as by mapping groups of bits to symbols for transmission. An example of a modulation scheme that may be used is Quadrature Amplitude Modulation (QAM) using phase and, amplitude keying. However, the specific modulation functions employed may depend on the wireless technology implemented by the software defined radio. In addition, components within processes module 224 may also filter the modulated bit stream using one or more in digital filtering algorithms. As with the other components within baseband processes module 226, the specific function performed by filtering components may depend on the wireless technology to be implemented.

For transmission of data, data processing may also be performed by hardware components on radio card 270. Accordingly, hardware card 270 may include one or more hardware components within data plane 290. In the example of FIG. 2, hardware data plane 290 includes offload hardware module 292, mixed electronics module 294 and antenna and RF electronics 296. Each of the hardware modules may be implemented using known digital and/or analog electronic circuit components. The specific implementation of each of the hardware modules may depend on the range of wireless technologies supported by radio card 270. However, as an example, antenna and RF electronics module 296 may contain, to support transmitting data, a power amplifier and a frequency converter for performing a frequency up-conversion. The frequency range over which the up-converter operates may depend on the frequency range over which radio card 270 may operate.

In addition, antenna and RF electronics module 296 may contain one or more antennas coupled to the power amplifier. In some embodiments, an antenna may be configurable for operation at different frequencies, with a specific configuration selected based on the wireless technology or technologies to be supported by the software defined radio. In other embodiments, antenna and RF electronics module 296 may contain multiple antennas that may be switchably connected to RF electronics components within module 296. In this embodiment, the antenna switched to the RF electronics may be selected to match the frequency of the signals to be transmitted. Such antennas may be implemented as patch antennas as is known in the art or in any other suitable way. In some embodiments, the antenna or antennas within antenna and RF electronics module 296 may be implemented on radio card 270. However, in some embodiments, the antennas may be positioned in any suitable location within computing device 200.

Mixed electronics module 294 may contain, for processing data to be transmitted, components that convert data generated by software processing into an analog signal for transmission by antenna and RF electronics module 296. For example, mixed electronics module 294 may contain a digital to analog converter as is known in the art. However, any suitable components may be used.

Offload hardware module 292 may contain hardware components that may perform some or all of the functions that may be performed within software data plane 220. Incorporation of offload hardware module 292 into radio card 270 provides an option for configuring a software defined radio to perform some functions either in software or in hardware. In the embodiment illustrated, offload hardware module 292 is an optional component on radio card 270. Accordingly, when configuring a software defined radio, if offload hardware module 292 is present and contains a component to perform a function that is used to implement a desired wireless technology, a component within offload hardware module 292 may be configured to perform that function. Alternatively, if offload hardware module 292 is not present or does not include a component to implement a function that is part of a desired wireless technology, that function may be implemented in software data plane 220.

Regardless of the specific components within each of the modules in software data plane 220 and hardware data plane 290, the collection of components implements the functions used for transmitting data according to a specific wireless technology. The components in software data plane 220 and hardware data plane 290 also collectively implement the functions for receiving data according to specified wireless technologies. Accordingly, antenna and RF electronics module 296 may contain one or more antennas to receive a wireless signal conveying that data. In some instances, the same components may be used for transmission and receipt of data. For example, antennas within antenna and RF electronics module 296 may be used for both transmission and reception of data. In other instances, separate components may be included for processing transmitted and received data. Antenna and RF electronics module 296 may include a low noise amplifier and a down converter for processing received data in addition to a power amplitude and up-converter for transmitting data. Mixed electronics module 294 may include an analog to digital converter for converting a received analog signal into a digital signal for further processing. Similarly, offload hardware module 292 may include components for performing functions on received data instead of or in addition to components for performing function on transmitted data.

Modules within software data plane 220 may likewise contain components for processing received data. For example, baseband processes module 226 may include a filter for operating on received data, which may be the same or different than the filter used for operating on transmitted data. Other components within baseband processes module 226 may demodulate received signals or decode demodulated signals. In some embodiments, the demodulation and decoding operations for received signals will be the inverse of the error correcting and modulation functions performed for transmitted data. However, the specific functions performed within each module may be configured according to a particular wireless technology to be implemented.

In the embodiment illustrated, a received signal, following processing within baseband processes module 226 may be provided to components within MAC processes module 224 for further processing. Those components may form a stream of bits output by baseband processes module 226 into packets or otherwise process the received data. In addition, components within MAC processes module 224 may acknowledge packets when received or otherwise perform a function to maintain communication according to a protocol applicable to a wireless technology implemented by the software defined radio.

Components within packet processing and security module 222 may also perform functions on received data. Those components may provide decryption or authentication functions that could be the inverse of the functions applied to transmitted data. In addition, components within packet processing and security module 222 may group packets or otherwise process them before notifying operating system 212 that packets have been received. Processing to notify packets to operating system 212 may be as is known in the art, though any suitable mechanism may be used and, as with other functions of the software defined radio, in some embodiments may be configurable.

To implement a software defined radio for a desired wireless technology or technologies, one or more of the hardware and software modules in the software data plane 220 and hardware data plane 290 may be configured. In the embodiment illustrated, components within the software data plane 220 are configured by components within control plane 240. In the embodiment illustrated, software control plane 240 includes a radio configuration and control module 244 that provides an interface to each of the configurable components within software data plane 220.

The specific mechanism by which radio configuration and control module 244 interacts with configurable components within software data plane 220 is not critical to the invention and any suitable mechanism may be used. However, in the embodiment illustrated, each of the modules 222, 224 and 226 includes a defined programming interface $228_1$, $228_2$, and $228_3$, respectively. Each of the interfaces $228_1$, $228_2$, and $228_3$ may be in a form that is published or otherwise made known to parties wishing to develop software components for use in a software defined radio. In this way, regardless of which components are included within data plane 220, radio configuration and control module 244 may interface with those components.

Though the specific format of the interface is not critical to the invention, in the embodiment illustrated, interfaces $228_1$, $228_2$, and $228_3$ allow for a two-way exchange of information, allowing status and control information to pass through the interface. Each of the components in software data plane 220 may, through an interface such as $228_1$, $228_2$, or $228_3$, provide status information, defining its operational status as well as its operational capabilities. For example, components within packet processing and security module 222 may communicate to radio configuration and control module 244 through interface $228_1$ specific security functions that they can support. Interface $228_1$ may also allow radio configuration and control module 244 to control which of those functions should be performed on packets to be transmitted or on received packets. Similarly, interface $228_2$ may allow components within MAC processes module 224 to identify the functions they can perform and to allow radio configuration and control module 244 to configure those components to perform functions used in implementing a desired wireless technology. A similar two-way exchange of information may occur through interface $228_3$, allowing radio configuration and control module 244 to determine functions supported by components within baseband processes module 226 and to specify a configuration for those components.

In the embodiment illustrated in FIG. 2, radio configuration and control module 244 also interfaces to hardware components on radio card 270. In the embodiment illustrated, hardware configuration and control module 280 serves as an interface between radio configuration and control module 244 and the hardware components in hardware data plane 290. The specific form of the interface between radio configuration and control module 244 and hardware configuration of control module 280 is not critical to the invention. However, in the illustrated example, the form of the interface is made known to the party implementing radio card 270 and is implemented over a standard computer bus. In this way, computing device 200 may be constructed using a radio card 270 from any suitable source electing to implement the interface to radio configuration and control module 244 using the format of bus 260.

Hardware configuration and control module 280 may be implemented using any suitable hardware components. For example, hardware configuration and control module 280 may be implemented as a gate array chip mounted to radio card 270. However, radio card 270 may be implemented using one or more application specific integrated circuits (ASIC), and hardware configuration and control module 280 may be implemented as one or more segments of such an ASIC.

Regardless of the specific implementation of hardware configuration and control module 280, in the embodiment illustrated, module 280 provides an interface to the hardware components in hardware data plane 290 that may be used either to configure the components or to obtain capability or other status information about those components. For example, hardware configuration and control module 280 may write values into control registers associated with hardware modules 292, 294 or 296. Conversely, hardware configuration and control module 280 may read status registers from those modules. Regardless of the specific interface mechanism between hardware configuration and control module 280 and the hardware components within hardware data plane 290, hardware configuration and control module 280 may provide to radio configuration and control module 244 the and status data obtained from the hardware components and may apply configurations to the hardware components as specified by radio configuration and control module 244.

In passing control and status information between radio configuration and control module 244 and hardware components within hardware data plane 290, hardware configuration and control module 280 may convert or otherwise process the information. As one example, mixed electronics module 294 may receive as a configuration input a specific digital code specifying an amount of frequency up-conversion to perform on a signal carrying transmitted data. Radio configuration and control module 244 may specify frequency up-conversion in a format different than that received by mixed electronics module 294. In that scenario, hardware configuration and control module 280 may be configured to receive a desired operating parameter for mixed electronics module 294 in a format generated by radio configuration and control module 244 and convert it into a format that can be applied by mixed electronics module 294 to achieve the desired amount of frequency up-conversion.

The specific functions that each of the components within hardware data plane 290 and software data plane 220 is configured to perform may depend on the overall configuration of the software defined radio. In the embodiment illustrated, the configuration was driven both by the wireless technology to be implemented by the radio and, if the wireless technology has variable parameters of operation, the specific parameters of operation selected for implementation at any given time. For example, a radio supporting Wi-Fi may be configured differently than a radio supporting a different technology, such as Wi-MAX. In addition, some wireless technologies, such as Wi-Fi, support different data rates or have other parameters that may be varied in use. One or more of the components implementing a software defined radio may be configured differently, depending on the data rate or values of other parameters to be supported for Wi-Fi communications.

Control plane 240 may contain one or more components to determine, based on a desired wireless technology and parameters of that wireless technology at any time, the specific configuration of the software defined radio. In the embodiment illustrated in FIG. 2, configuration logic module 242 performs that function. The specific implementation of configuration logic module 242 is not critical to the invention.

As an example, configuration logic module 242 may be implemented as a rules engine, applying a set of rules to determine a specific configuration for each of the components in software data plane 220 and hardware data plane 290 at any given time based on one or more inputs received from a user or other components within computing device 200 and information on operating conditions. However, the specific implementation of configuration logic module 242 is not critical to the invention and any suitable implementation may be used.

Regardless of the specific implementation of configuration logic module 242, module 242 may receive one or more types of inputs used in determining a desired configuration for the hardware and software components of the software defined radio at any given time. In the embodiment of FIG. 2, inputs are provided to configuration logic module 242 from a cognitive module 252, an offload engine 246, and profile manager 248.

In the embodiment illustrated, profile manager module 248 provides to configuration logic module 242 the specification of a wireless technology to be implemented by the software defined radio. The specification may define the functions to be collectively implemented by components within software data plane 220 and hardware data plane 290. Those functions may be specified in any suitable way. For example, the functions may be specified by indicating operating parameters of one or more components within software data plane 220 and hardware data plane 290. Alternatively or additionally, the specification may include executable code that may be added as a component to one or more of the modules within software data plane 220.

Profile manager module 248 may obtain specifications of wireless technologies in any suitable way. In the embodiment illustrated, control plane 240 includes a profile store 250 containing one or more wireless technology specifications. Profile store 250 may be implemented in computer storage media associated with computing device 200. As described in connection with FIG. 1, specifications for wireless technologies, such as specification 132 (FIG. 1) may be downloaded over a network from a server or other suitable source. However, the source of wireless technology specifications in profile store 250 and the specific implementation of profile store 250 are not critical to the invention and any suitable mechanisms may be used to obtain wireless technology specifications and selecting one or more specifications for use at any given time.

In addition to providing wireless technology specifications to configuration logic module 242, profile manager module 248 may provide input to configuration logic module 242 indicating which wireless technologies to be implemented by a software defined radio at any time. Profile manager module 248 may provide indications of wireless technologies to implement based on input received from one or more sources. For example, profile manager module 248 may include a user interface, allowing a user to select a wireless technology for implementation by a software defined radio. Similar input may be received alternatively or additionally from operating system 212, applications 214, a group policy store on computer 200 that was downloaded from a group policy server or any other suitable source.

Configuration logic module 242 may also receive input concerning a desired configuration of components within software data plane 220 and hardware data plane 290 from offload engine module 246. As indicated in FIG. 2, radio card 270 may include offload hardware module 292. When present, offload hardware module 292 may perform functions that could also be performed by software components within software data plane 220. Offload engine module 246 receives and analyzes capability information output by offload hardware module 292. Using this capability information, offload engine module 246 may analyze a wireless technology specification to determine whether any of the functions needed to implement the wireless technology specification may be performed in offload hardware module 292. If offload hardware module 292 supports any of the needed functions, offload engine module 246 may provide an indication to configuration logic module 242 that certain functions may be allocated to offload hardware module 292. In response, configuration logic module 242 may generate appropriate configuration commands, causing those functions to be implemented by components within offload hardware module 292.

In some embodiments, offload engine module 246 may perform additional processing before indicating to configuration logic module 242 that hardware components are available to perform certain data processing functions. For example, hardware within computing system 200 may be limited in one or more ways and overall operation of computing system 200 may, in some instances, be optimized by configuring software components to perform data processing functions even if offload hardware module 292 contains components that could perform the same functions.

Offload engine module 246 may be implemented in any suitable way. For example, offload engine module 246 may be implemented using rule-based technology.

In addition, configuration logic module 242 may receive input from cognitive module 252 that configuration logic module 242 may use in configuring hardware and/or software components of the software defined radio. In the embodiment illustrated, cognitive module 252 receives status information concerning operation of the hardware and/or software components implementing a software defined radio. Based on the status information, cognitive module 252 may perform processing to recognize that an adaptation is required in the configuration of the software defined radio. In some embodiments, the adaptation may involve modifying an operating parameter within a wireless technology.

For example, many wireless technologies support operation at multiple frequencies. Status information output by one or more of the components may allow cognitive module 252 to identify that a different channel should be used. For example, a received signal output by a component within antenna and RF electronics module 296 may indicate that certain frequencies are less utilized or have less interference than frequencies currently in use by the software defined radio. In this scenario, cognitive module 252 may report to configuration logic module 242 that a different frequency would provide more reliable communication and configuration logic module 242 may generate configuration commands to one or more of the hardware or software components in the software defined radio to change the frequency.

Alternatively or additionally, cognitive module 252 may identify conditions requiring other adaptations within a wireless technology. For example, cognitive module 252 may identify that either a lower or higher transmit power level is desirable. In response, configuration logic module 242 may generate commands configuring a power amplifier within antenna and RF electronics module 296 to transmit at a different power level.

More generally, cognitive module 252 may collect status information from any component within software data plane 220 or hardware data plane 290 and perform processing on the status information to identify a condition with ongoing communications that warrants an adaptation. In many instances, the status information will relate to communications, such as measured errors or an amount of data to be transmitted. However, the status information used by cognitive module 252 need not be so limited. The status information may include battery life or other information about computing device 200 or any other available information useful in selecting or setting parameters of a wireless technology.

The adaptation may be implemented by configuration logic module 242 issuing commands that reconfigure one or more of the components in either software data plane 220 or hardware data plane 290 to cause the adaptation without charging the wireless technology implemented by the software defined radio.

Cognitive module 252 is not limited to identifying adaptations within the same wireless technology. In some embodiments, cognitive module 252 may be configured to recognize that more efficient communications may be achieved by communicating using a different wireless technology. In such an embodiment, configuration logic module 242 may obtain from profile manager module 248 a specification for a different wireless technology. Configuration logic module 242 may then generate configuration commands to reconfigure the software defined radio to communicate using a different wireless technology. In this way, computing device 200 may be flexibly controlled to implement efficient communication by adapting within a wireless technology or across wireless technologies.

Figure 3:
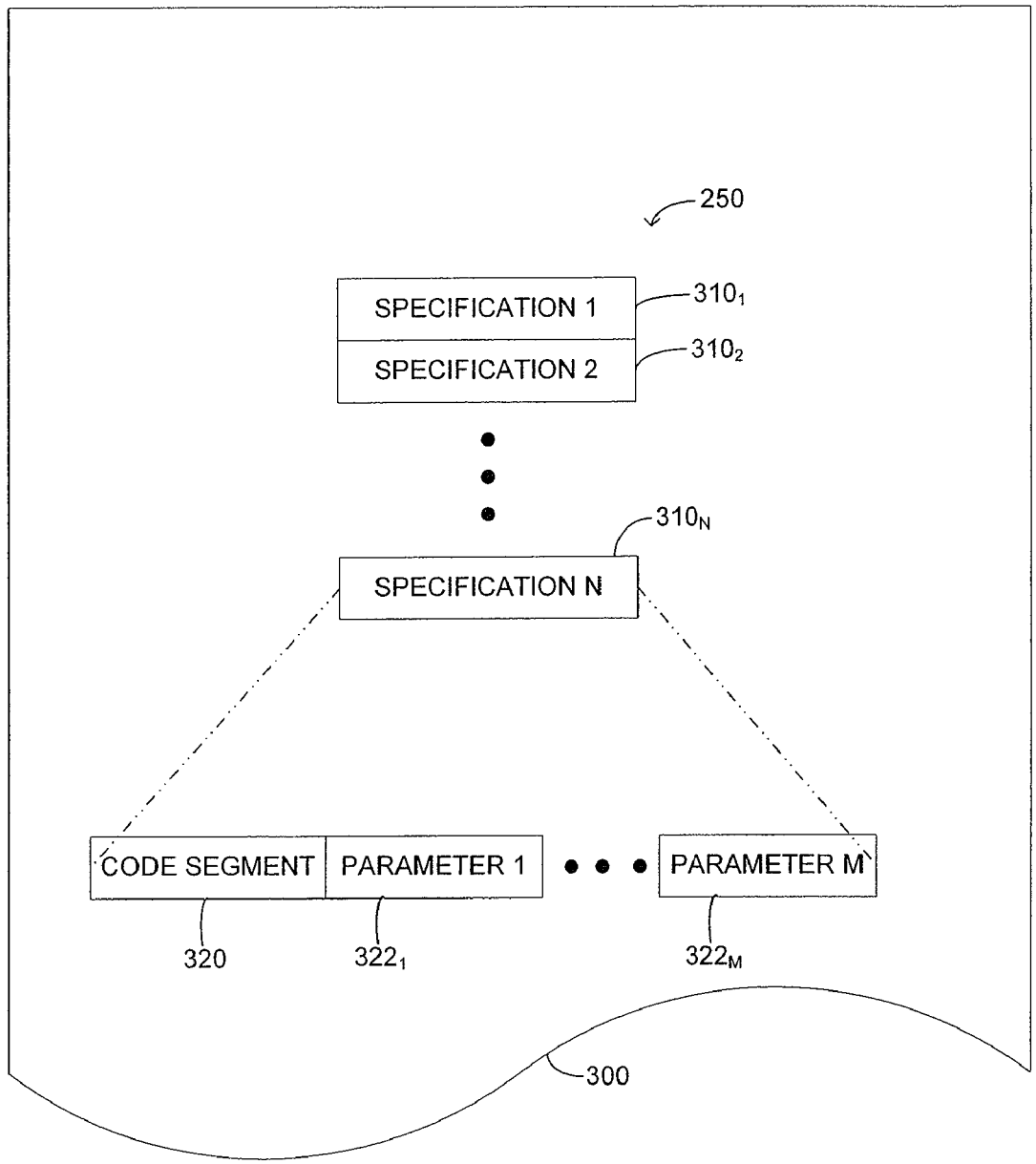
FIG. 3 is a sketch of data structure for a library of wireless technology specifications according an embodiment of the invention.

If an adaptation to a different wireless technology is desired, profile manager 248 may obtain a wireless technology specification from profile store 250 and provide the specification to configuration logic 242. Specifications may be stored in profile store 250 in any suitable way. FIG. 3 illustrates as one example, a possible implementation of profile store 250.

As illustrated in FIG. 3, profile store 250 may be implemented in any suitable computer storage media. For example, data defining one or more specifications may be recorded on computer storage media 300. In the example illustrated, records $310_1, 310_2, \ldots 310_N$ are shown, each storing information defining a specification for a wireless technology.

The specific format in which information defining a wireless technology is stored within each of the records $310_1 \ldots 310_N$ is not critical to the invention. However, an exemplary structure for record $310_N$ is shown. In the example of FIG. 3, record $310_N$ contains multiple fields, each field defining information used in configuring the software defined radio. In this example, each record contains two types of fields. One type of field, represented by field 320, contains information identifying executable code. The executable code identified in field 320 may be a component or components of any of the modules within software data plane 220 (FIG. 2). Executable code may be identified in field 320 in any suitable way. For example, computer executable instructions may be stored as part of record $310_N$. As another example, field 320 may include a list of executable components stored elsewhere within computing device 200 (FIG. 2). As a further example of a possible implementation, field 320 may store one or more links to storage locations outside of computing device 200 from which executable components may be obtained.

In addition, record $310_N$ is shown to contain multiple fields, represented by fields $322_1 \ldots 322_M$, that store parameters for configuring hardware or software components in hardware data plane 290 or software data plane 220 (FIG. 2). The information in fields $322_1 \ldots 322_M$ may be stored in any suitable form, which may depend on the specific hardware or software components to which the values in fields $322_1 \ldots 322_M$ are to be applied.

Figure 4:
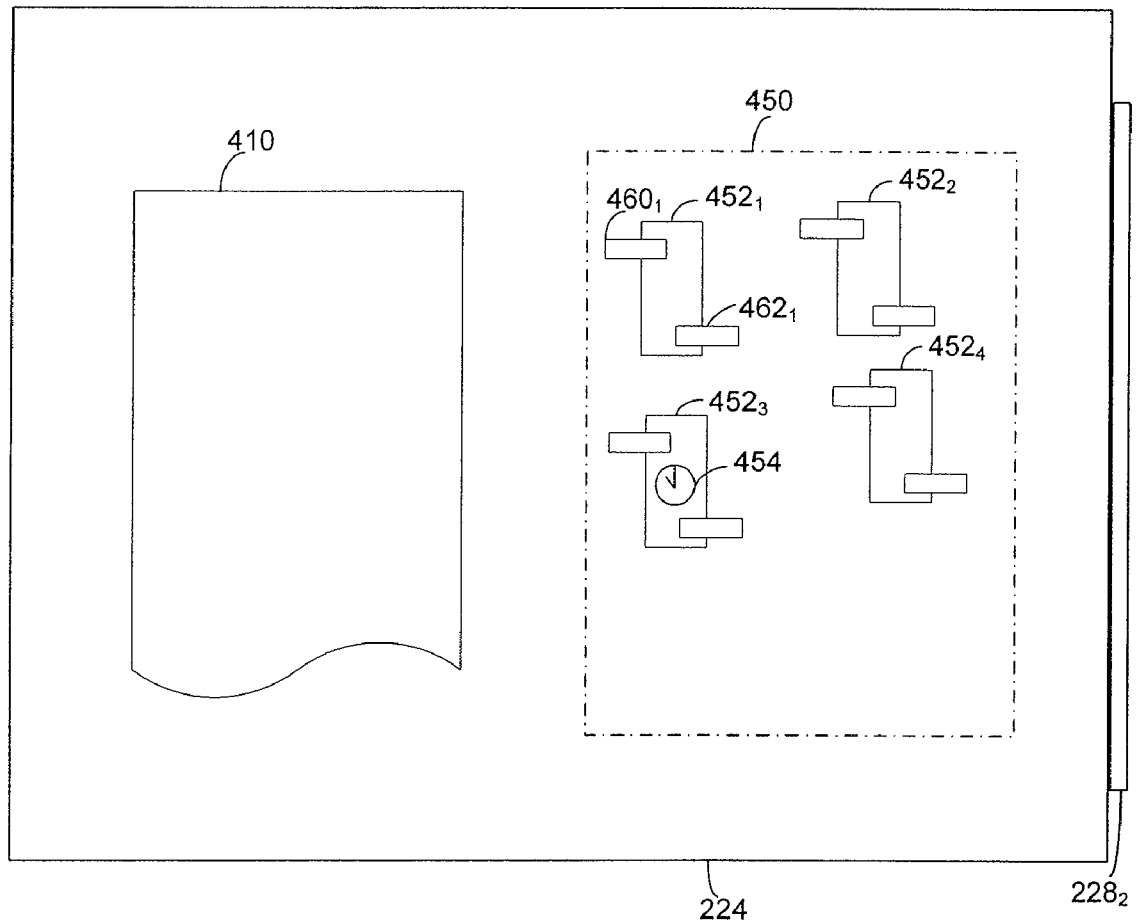
FIG. 4 is a sketch of a software module of a software defined radio according to an embodiment of the invention.

With a wireless technology specification in the form illustrated in FIG. 3, components within control plane 240 may configure a software defined radio by providing executable components and/or specifying values of operating parameters of those components. FIG. 4 illustrates an example module within a software defined radio that has been configured by application of one or more specifications in the form illustrated in FIG. 3.

FIG. 4 shows as an example of a module within software data plane 220 MAC processes module 224. However, in some embodiments, each of the modules within software data plane 220 may have an architecture generally as illustrated in FIG. 4.

FIG. 4 shows that MAC processes module 224 includes an interface $228_2$ through which radio configuration and control module 244, or any other suitable component, may configure the module. Through interface $228_2$, executable components may be added to module 224. In the operating state depicted in FIG. 4, executable components $452_1, 452_2, 452_3$ and $454_4$ have been added.

Each of the components $452_1 \ldots 452_4$ may represent a programming object or component in any other suitable form. Each of the components $452_1 \ldots 452_4$ may perform one or more of the functions performed within module 224. In the example in which module 224 performs MAC processes, each of the components within component group 450 may perform a function associated with MAC processes, such as responding to a control packet or grouping received packets that have been fragmented. However, the specific number and function of components within component group 450 may depend on the function of module 224 and the wireless technology or technologies for which the software defined radio has been configured.

Though the specific format in which components $452_1 \ldots 452_4$ are implemented is not critical to the invention, the example embodiment shows that each of the components may have the same general format. In the embodiment illustrated, each of the components within component group 450 is implemented as a "plug in." When implemented as a plug in, each of the components $452_1 \ldots 452_4$ includes one or more interfaces in a defined format, allowing other components of computing system 200 to interact with the components. In this way, components may be readily added to component group 450 as new functions to be implemented by software defined radio are identified.

As one example, wireless technology protocols frequently undergo multiple revisions. It may be desirable, for each revision, to generate one or more components that perform functions necessary to implement the revised protocol. With the flexibility provided by the architecture of FIG. 4, a computing device 200 may be readily configured to operate according to a modified protocol, even though not specifically designed for that protocol.

To support operation as a plug in, each of the components within component group 450 may implement one or more defined interfaces. In the embodiment illustrated, each of the components within component group 450 implements two interfaces. Taking component $452_1$ as illustrative, an interface $460_1$ and an interface $462_1$ are shown. Interface $460_1$ may be a data interface and interface $462_1$ may be a control interface. Through interface $460_1$, other components within computing device 200 may supply data to component $452_1$ for processing. Alternatively or additionally, other components within computing device 200 may obtain data processed by component $452_1$ through interface $460_1$. Depending on the type and nature of component $452_1$ operating system 212, other components within module 224 or within other modules may exchange data with component $452_1$ through interface $460_1$.

Component $452_1$ is also shown to contain control interface $462_1$. In the embodiment of FIG. 2, radio configuration and control logic 244 may receive status information from component $452_1$ and provide control information to component $252_1$ through interface $462_1$. For example, through interface $462_1$, component $452_1$ may receive values of parameters specifying one or more aspects of the operation of component $452_1$. Alternatively or additionally, component $452_1$ may use interface $462_1$ to provide status information.

In some embodiments, all of the functionality within module 224 may be implemented by components within component group 450. However, in some embodiments, module 224 may include one or more fixed components 410. The fixed components 410 may be present in module 224 regardless of the specific configuration of the radio at any given time. For example, fixed component 410 may coordinate operation of components within component group 450, facilitate interfacing between the components in component group 450 and other components of computing device 200 (FIG. 2) or perform functions that are performed by module 224 regardless of configuration.

FIG. 4 illustrates a further feature that may be implemented using the componentized architecture of FIG. 4. Some or all of the components may incorporate digital rights management to control some aspect of the usability of those components. In the example of FIG. 4, component $452_3$ is shown to include digital rights management, as illustrated symbolically by rights management element 454. Rights management element 454 may represent a cryptographic mechanism applied to component $452_3$ that precludes execution of component $452_3$ except under allowed conditions. The conditions under which execution of component $452_3$ are allowed may be defined as is known in the art of digital rights management or in any other suitable way. As one example, the conditions may be defined based on time. Rights management element 454 may preclude execution of component $452_3$ after a predefined time. With this capability, components that provide functions for a software defined radio may be "leased."

Alternatively, rights management element 454 may be used to control other conditions under which component $452_3$ is allowed to execute. For example, component $452_3$ may be allowed to execute only for so long as the user of computing device 200 maintains a subscription to a network or other service.

Figure 5A:
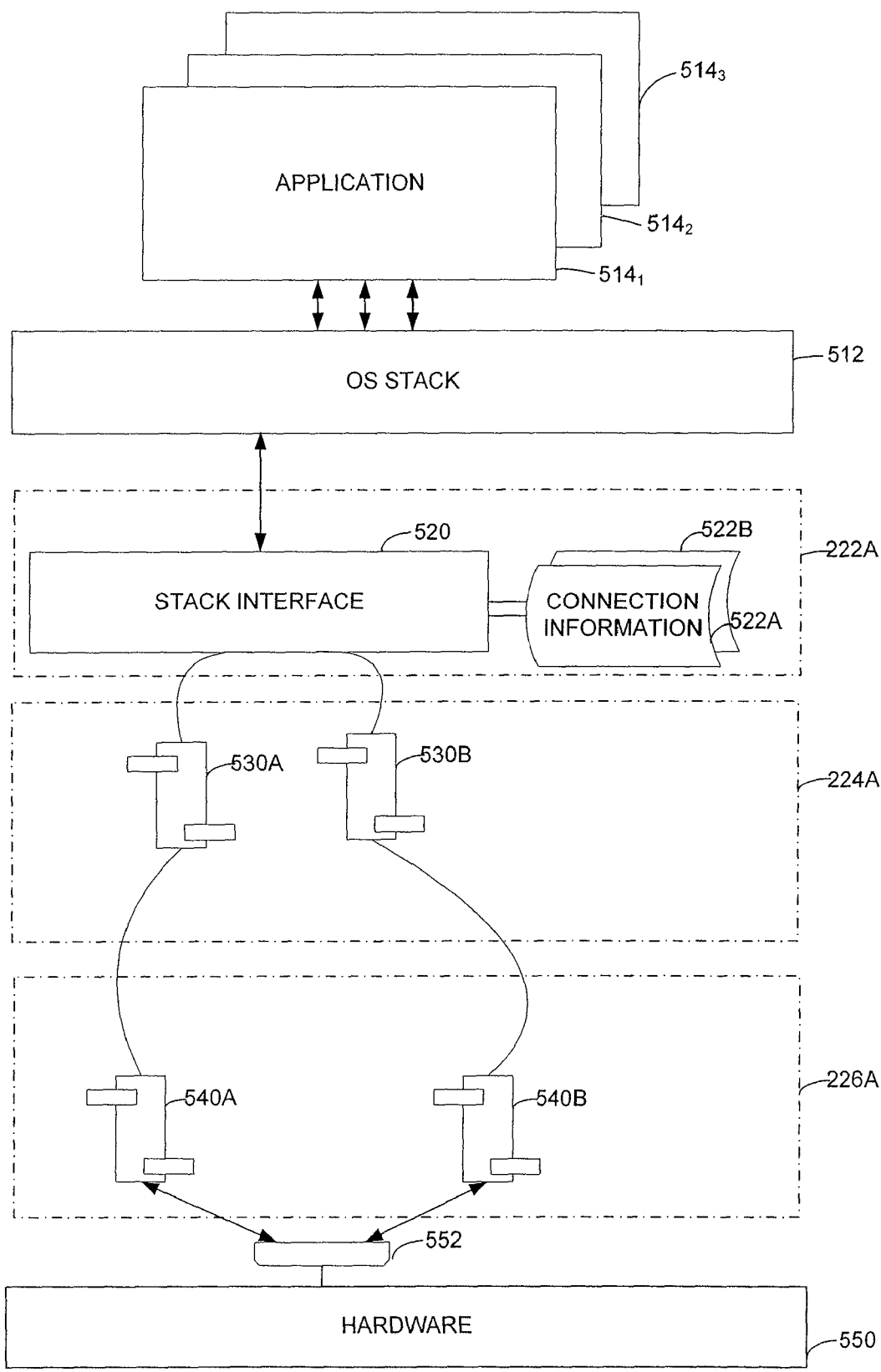
FIG. 5A is a sketch of a computing device incorporating a software defined radio in a first configuration according to an embodiment of the invention.

Turning to FIG. 5A, a further example is provided of a function that may be implemented with the software defined radio using an architecture according to embodiments of the invention. FIG. 5A illustrates that a software defined radio may be configured to support communications using multiple wireless technologies concurrently. Multiple wireless technologies may be supported concurrently by configuring modules of the software defined radio to implement all functions collectively performed by all of the multiple wireless technologies to be implemented.

In the example of FIG. 5A, one or more applications $514_1$, $514_2$ and $514_3$ generate and/or consume data for wireless communications. Applications $514_1 \ldots 514_3$ may interface with a software defined radio through an operating system stack 512, using a stack mechanism as is known in the art. However, in the example of FIG. 5A, application $514_1$ may communicate using a different wireless technology than application $514_3$.

The operating system stack 512 may interface with the software defined radio using any suitable interface. However, a conventional stack interface may be employed. Accordingly, packet processing and security module 222 is shown to have a stack interface 520, which may be implemented as is known in the art. However, to the extent packet processing and security module 222 stores different types of connection information for connections using different wireless technologies, two components may be included within packet processing and security module 222 to store connection information for the wireless technologies used by applications $514_1$ and $514_3$. Accordingly, FIG. 5A illustrates components 522A and 552B storing connection information for two wireless technologies.

In addition, MAC processes module 224 may also contain components to implement two wireless technologies. In this example, component 530A is shown to implement the wireless technology used by application $514_1$ and component 530B is shown to implement the wireless technology used by application $514_3$.

Likewise, baseband processes module 226A is shown to contain components 540A and 540B, implementing functions for the wireless technology used by application $514_1$ and $514_3$, respectively.

In the embodiment illustrated, hardware 550 is shown to interface with both components 540A and 540B. Hardware 550 may contains sufficient components to support processing of data for two wireless technologies simultaneously. Multiplexing component 552 may be incorporated to provide the interface to hardware 550. Multiplexing component 552 may operate according to a time division multiplexed scheme in which, in some intervals, it passes data according to the wireless technology for application $514_1$ and in other intervals it passes data for the wireless technology used by application $514_3$. When time multiplexed, the operation of hardware 550 may switch between data processing for the different wireless technologies at a sufficiently high rate that the radio may be regarded as supporting both wireless technologies concurrently.

Figure 5B:
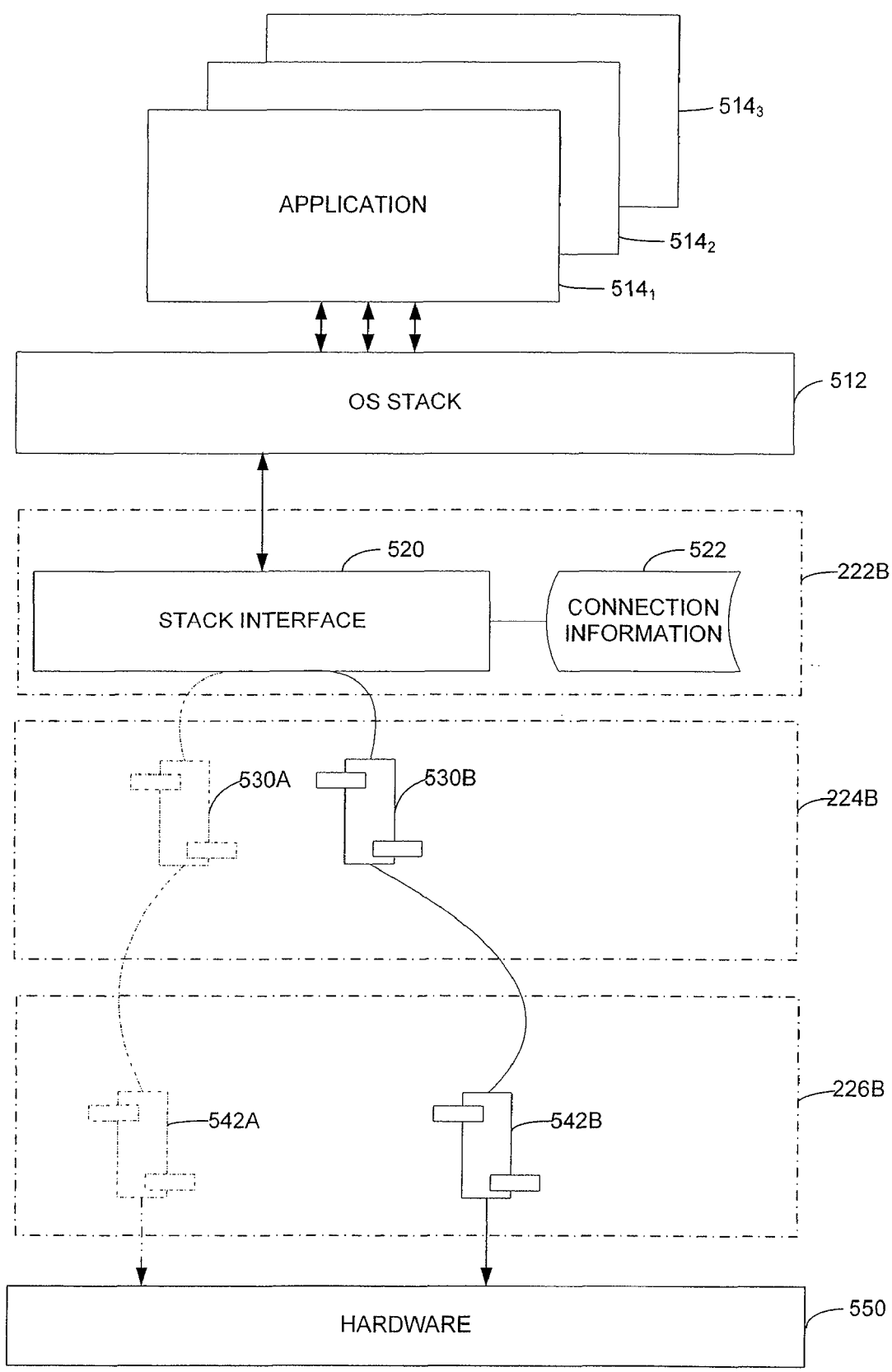
FIG. 5B is a sketch of a computing device of FIG. 5A in an alternative configuration.

FIG. 5B shows an alternative operating sequence in which two wireless technologies are supported sequentially. As in the example of FIG. 5A, FIG. 5B shows applications $514_1 \ldots 514_3$ communicating wirelessly through operating system stack 512. Operating system stack 512 interfaces with stack interface module component 520 within packet processing security module 222B. To the extent information is maintained about the connections that applications $514_1 \ldots 514_3$ have formed using a wireless technology with other components in other devices, that information may be maintained in connection information component 522.

At a first time, the software defined radio illustrated in FIG. 5B may be configured to communicate using a first wireless technology. To support communication with a first wireless technology, MAC processes module 224B may be configured, at the first time, with a component 530A. Likewise, baseband processes module 226B may be configured with component 542A to support wireless communication using the first wireless technology.

At some later time, the radio may be reconfigured for operation according to a second wireless technology. The reconfiguration may be made for any suitable reason. For example, cognitive module 252 (FIG. 2) may detect a source of interference disrupting communications according to the first wireless technology. In response, configuration logic module 242 (FIG. 2) may reconfigure the software defined radio for communication using a second wireless technology. This reconfiguration may be achieved, for example, by configuring MAC processes module 224B with component 530B and reconfiguring baseband processes module 226B with component 542B. Accordingly, at the second instance of time, communication may be achieved using the second wireless technology.

FIG. 5B illustrates any switching from the first wireless technology to the second wireless technology, the operation of some of the modules within data plane 220 (FIG. 2) change. However, packet processing and security module 222B was not reconfigured. Accordingly, connection information maintained within connection information component 522 was not changed as a result of the reconfiguration. Accordingly, though the software defined radio communicates using a different wireless technology, any connections established by applications $514_1 \ldots 514_3$ may be maintained.

In some instances, reconfiguring the software defined radio will change the frequency characteristics of the signals transmitted or received by the radio. In some embodiments, mixed electronics module 294 and antenna and RF electronics module 296 (FIG. 2) will be implemented as wideband components. These components may pass RF signals over a very wideband width. Accordingly, as the radio is reconfigured, changes to the operating parameters of the components within mixed electronics module 294 or antenna and RF electronics module 296 may be unnecessary. In other embodiments, some or all of the components within mixed electronics module 294 and antenna and RF electronics module 296 may receive control inputs, such as through hardware configuration and control module 280, that allow the operating characteristics of those components to be adjusted as the software defined radio is reconfigured for operation at different frequencies or in conjunction with RF signals having different frequency spectra.

Figure 6:
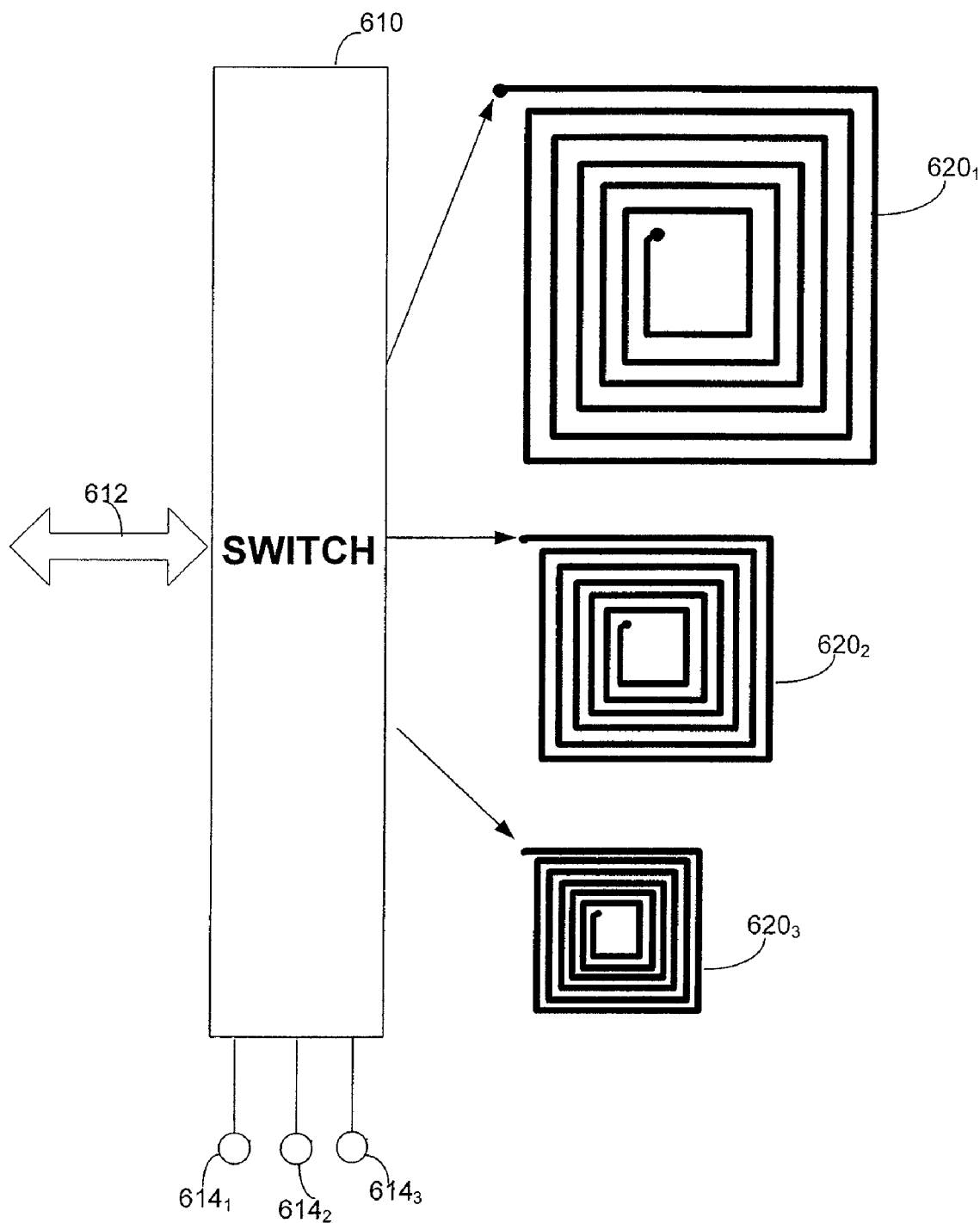
FIG. 6 is a sketch of a configurable antenna according to an embodiment of the invention.

One component within antenna and RF electronics module 296 that may be configurable is the antenna. FIG. 6 illustrates an embodiment of a configurable antenna according to the invention. The configurable antenna illustrated in FIG. 6 uses multiple spiral patch antennas each of which may be in a form as is known in the art. In this example, three spiral patch antenna elements $620_1$, $620_2$, and $620_3$ are shown. The number of antenna elements is not critical to the invention and a computing device may be implemented with any suitable number of antennas.

Further, the shape of each antenna element is not critical to the invention. In this example, each antenna element $620_1$, $620_2$, $620_3$ is implemented as a spiral antenna. Such an antenna may be implemented using known techniques to position conductive traces in a spiral pattern. Such an antenna may be constructed using known printed circuit fabrication techniques or in any other suitable way.

Each of the antennas may be physically mounted to any suitable component of a computing device. For example, each patch antenna may be formed on a printed circuit board on which a wireless network interface card is implemented. As another example, each antenna may be embedded i a plastic case for a computing device. Though, the mounting location of the antennas is not critical to the invention and any suitable mounting location may be used.

In the example illustrated, each of the spirals is formed with straight segments, causing the spiral to have a generally square shape. However, embodiments may be constructed in which the conductive traces forming the patch antenna are routed in a true spiral, with curved traces. As an example of a further possible variation, it is not necessary that the antennas be implemented as a patch antenna, and any suitable antenna shape, whether in one, two or three dimensions, may be employed.

Regardless of the specific shape of the antennas $620_1$, $620_2$, $620_3$, each may be connected to other components within the antenna and RF electronics module 296 through a switch 610. In this example, switch 610 is connected to an input/output port 612 within antenna and RF electronics module 296 (FIG. 2). For example, inputs/output port 612 may be connected to the output of a power amplifier, which drives a signal for transmission. Alternatively or additionally, input/output port 612 may be connected to the input of a low noise amplifier that receives a signal picked up by one of the antennas. Accordingly, input/output port 612 may, in various embodiments of the invention, represent an input port, an output port or a combined input and output port. In embodiments of the invention, each of the antennas $620_1$, $620_2$, and $620_3$ may radiate an RF signal, pick up an RF signal radiated by another computing device or both radiate and pick up signals.

In the embodiment of FIG. 6, each of the antennas $620_1$, $620_2$, $620_3$ is shown with different physical dimensions. The different physical dimensions result in each of the antennas being sensitive to signals of different frequency characteristics. As an example, the nominal frequency that an antenna supports is related to the size of the aperture of the antenna. For example, many antennas are sensitive to signals of a frequency having a wavelength that is roughly the same as the size of the antenna aperture. Consequently, antennas sensitive to higher frequencies are generally smaller than those sensitive to signals as lower frequencies because higher frequency signals have shorter wavelengths. In the example of FIG. 6, antenna $620_1$ may be connected to input/output port 612 to transmit or receive relatively low frequency signals. In contrast, antenna $620_3$, because it is smaller than antenna $620_1$, may be connected to input/output port 612 when relatively high frequency signals are to be transmitted or received.

To control, at any given time, which of the antennas $620_1$, $620_2$, or $620_3$, is connected to input/output port 612, switch 610 has control inputs. Here, control inputs $614_1$ $614_2$ and $614_3$ are shown. In this simple example, each control input $614_1$ $614_2$ and $614_3$ corresponds to an antenna element $620_1$, $620_2$, $620_3$, respectively. In response to a digital value on a control input, switch 610 may complete a connection between input/output port 612 and a respective antenna $620_1$, $620_2$, or $620_3$. However, the specific encoding of the control inputs is not a limitation in the invention and any suitable format of control inputs may be used to control the specific antenna in use at any given time.

Figure 7:
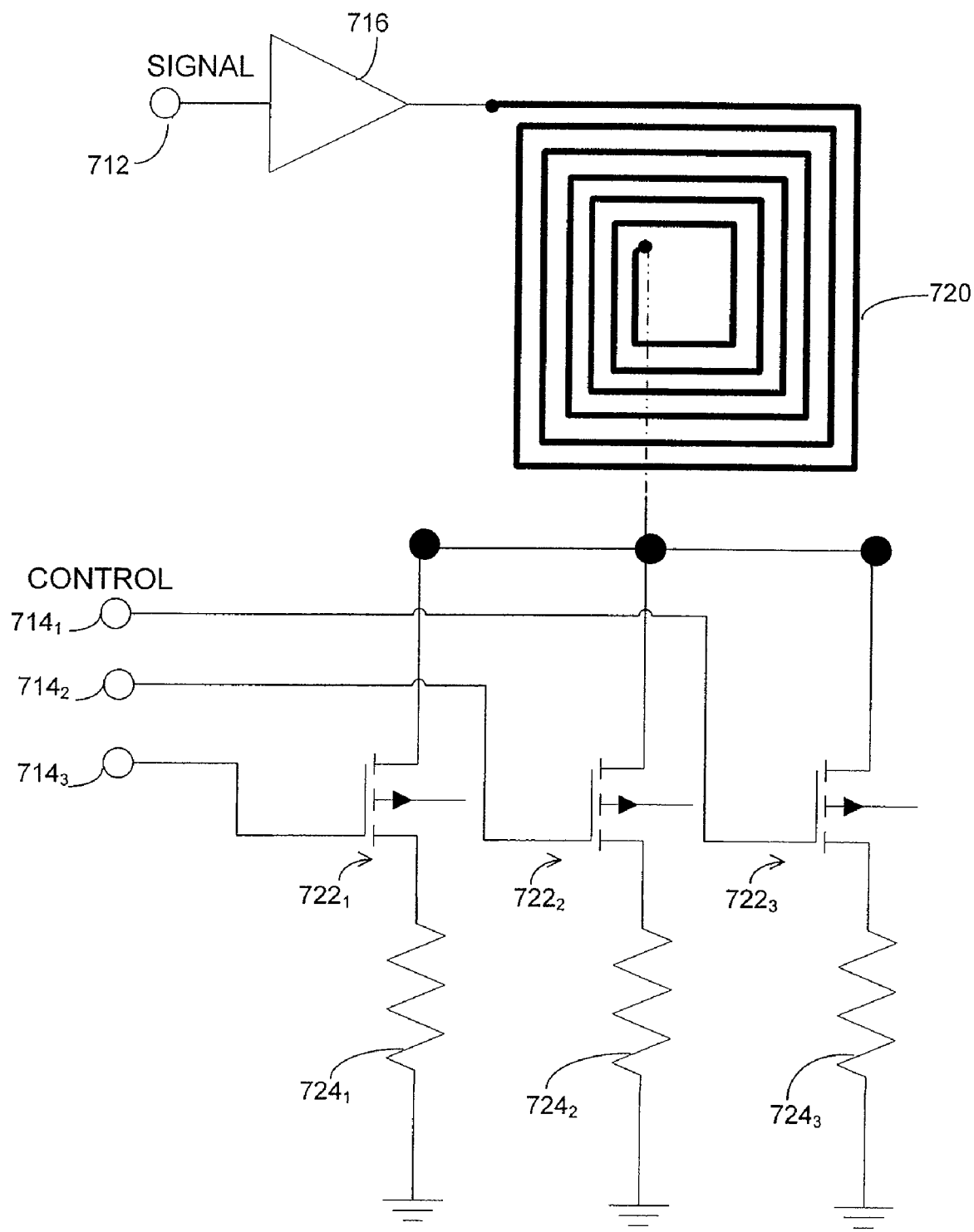
FIG. 7 is a sketch of a configurable antenna according to an alternative embodiment of the invention.

FIG. 6 illustrates an embodiment in which an antenna is configured by selecting different antenna elements for use at different times. An antenna may also be configured in other ways. FIG. 7 illustrates an example of configuring a single antenna element 720 to selectively pass, at different times, signals with different frequency characteristics. In the example of FIG. 7, antenna element of 720 is also square, spiral patch antenna similar to one of the antenna elements of FIG. 6, though the specific configuration of antenna element 720 is not critical to the invention. In this case, antenna element 720 is used to radiate signals. A signal to be radiated is applied at an input port 712 and amplified in RF power amplifier 716, which drives an input of antenna element 720.

In the embodiment of FIG. 7, the frequency characteristics of antenna 720 may be configured by adjusting an adjustable load attached to antenna element 720. In the example of FIG. 7, the adjustable load is represented by a set of antenna terminations of different impedance values. For example, antenna terminations may be provided by resistors $724_1$, $724_2$ or $724_3$. In the embodiment illustrated, each of the possible terminations is coupled to antenna element 720 through a switching transistor. Here RF switching transistor $722_1$, $722_2$ and $722_3$ are used to selectively couple, at any given time, one or more of the resistors $724_1$, $724_2$ or $724_3$, respectively, to antenna element 720. Because the specific value of the termination of an antenna may influence the frequency characteristics of the antenna, such as by changing the nominal frequency or bandwidth of the antenna, connecting one or more of resistors $724_1$, $724_2$ or $724_3$ to antenna element 720 may change the frequency characteristics of the antenna.

As with the example if FIG. 6, the configurable antenna of FIG. 7 includes multiple control inputs, here, control inputs $714_1$, $714_2$ and $714_3$ are illustrated. Each of the control inputs may receive a value that turns on or off a corresponding one of the RF switching transistors $722_1$, $722_2$ or $722_3$, respectively. When a switching transistor is turned on, its associated load will be coupled to antenna element 720, thereby changing the frequency characteristics of the overall antenna. The values at the control inputs $714_1$, $714_2$ and $714_3$ may be generated within the control plane of the software defined radio and may be generated with values that cause the antenna to have frequency characteristics that match, at any given time, the frequency characteristics of a signal to be radiated by the software defined radio.

Figure 8:
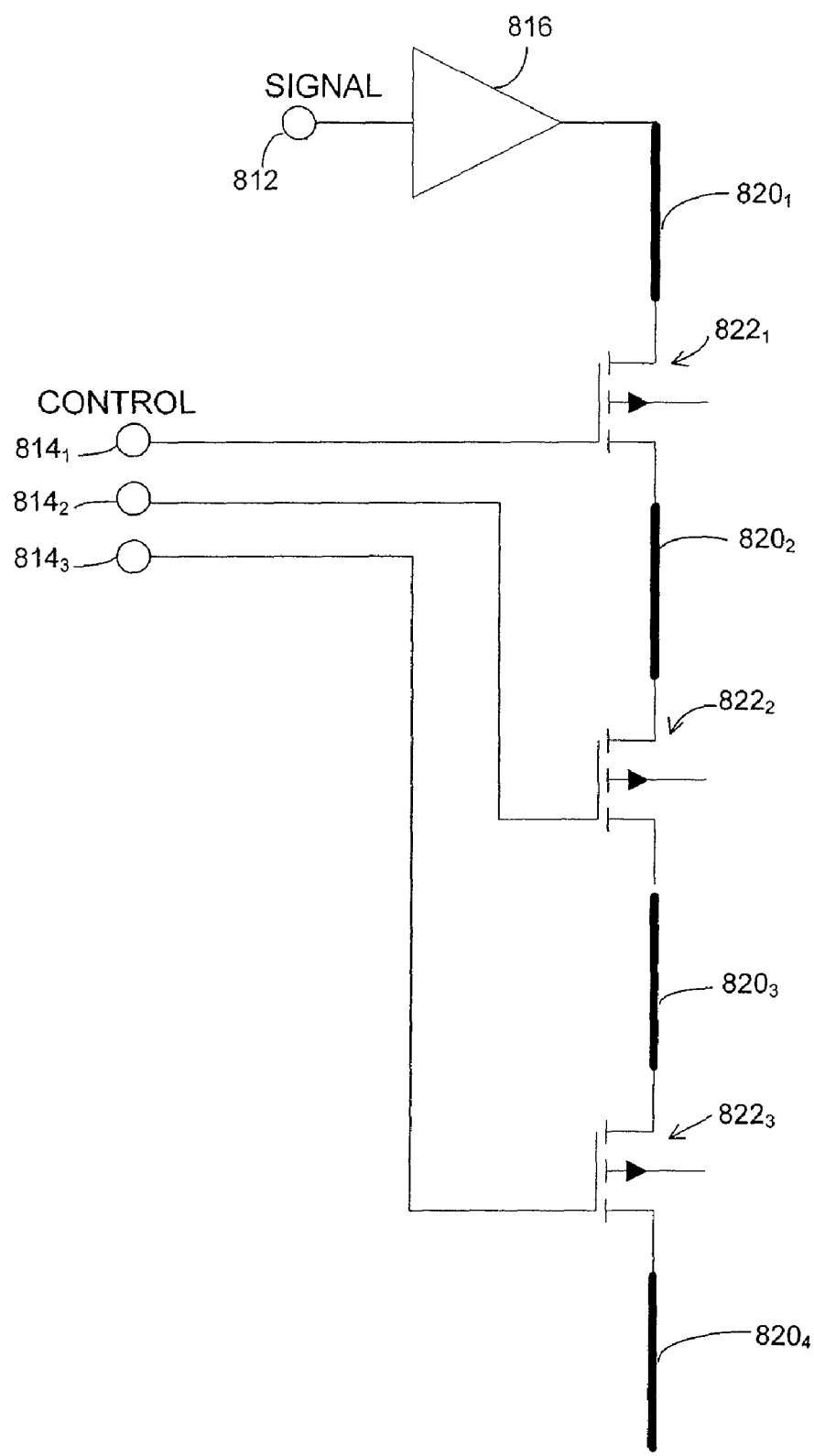
FIG. 8 is a sketch of a configurable antenna according to a further embodiment of the invention.

FIG. 8 illustrates a further embodiment of a configurable antenna, which also includes control inputs that may be connected to the control plane of a software defined radio to ensure that the antenna to which the radio is couple is sensitive to signals with frequency characteristics that are compatible with RF signals to be transmitted or received by the radio. In this example, a signal, such as may be generated by other components within the data plane of the software defined radio, is coupled to input port 812. Input port 812 may be coupled to the input of an RF power amplifier 816, which drives a configurable antenna. In this embodiment, a configurable antenna is implemented with a plurality of conductive segments $820_1$, $820_2$, $820_3$, and $820_4$. The conducting segments are joined by RF switching transistors $822_1$, $822_2$, and $822_3$, and depending on the state of the RF switching transistors, the length of the conducting segments that are electrically connected may be changed. For example, when switching transistor $822_1$ is turned off, only conducting segment $820_1$ forms a portion of the antenna. In contrast, when RF switching transistor $822_1$ is turned on, conducting segment $820_2$ additionally forms a portion of the antenna.

In a similar fashion, the state of RF switching transistor $822_2$ may dictate whether conducting segment $820_3$ forms a portion of the aperture of the antenna. RF switching transistor $822_3$ likewise dictates whether conducting segment $820_4$ forms a portion of the antenna.

In the embodiment illustrated, four conducting segments $820_1$, $820_2$, $820_3$ and $820_4$ and three switching transistors $822_1$, $822_2$, and $822_3$ are shown. The specific numbers of segments and switching transistors is for illustration only and any suitable numbers may be used. However, this number allows the antenna of FIG. 8 to be configured with four different lengths. In one configuration, the antenna includes only conductive segment $820_1$. In a second configuration the antenna includes conducting segments $820_1$ and $820_2$. In a third configuration the antenna includes conducting segments $820_1$, $820_2$, and $820_3$. In a fourth configuration, the antenna includes all four of the conducting segments $820_1$, $820_2$, $820_3$ and $820_4$.

Because the frequencies to which the antenna is sensitive, either in terms of the effectiveness of receiving signals of that frequency or the effectiveness of radiating signals of that frequency, depends on the length of the antenna aperture, the frequency characteristics of the antenna may be changed by turning on or off selective ones of the switching transistors $822_1$, $822_2$, and $822_3$. In the embodiment of FIG. 8, the RF switching transistors may be separately controlled by the values of signals applied to control inputs $814_1$, $814_2$, and $814_3$. As with the configurable antennas illustrated in FIGS. 6 and 7, the values at control inputs $814_1$, $814_2$, and $814_3$ may be applied by components on the control plane of a software defined radio.

The values of the control signals that configure a configurable antenna may be derived in any suitable way. However, in some embodiments, the control signals may be derived using mapping tables stored in computer readable media associated with the computing device containing the configurable antenna.

Figure 9A:
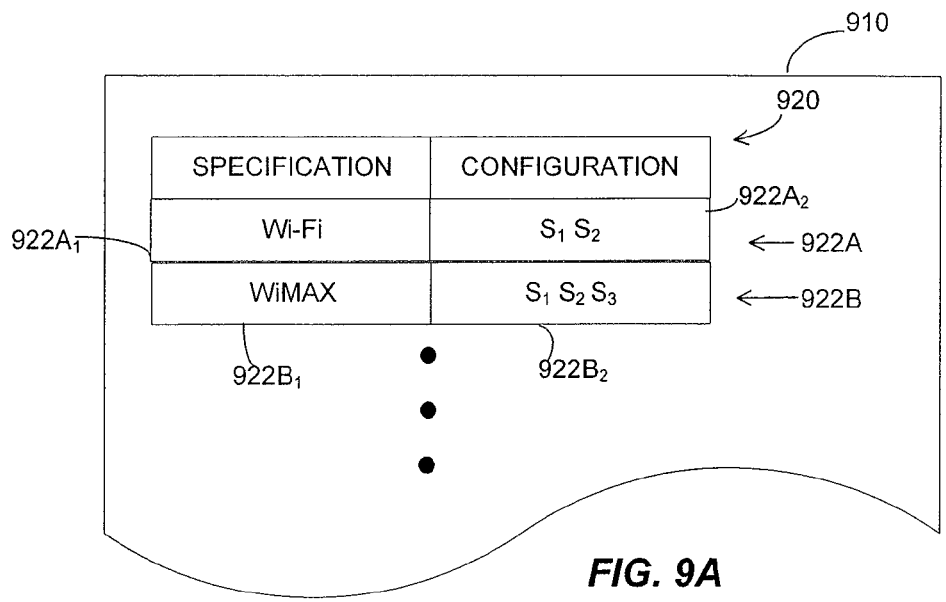
FIGS. 9A and 9B schematically illustrate data structures used in a control plane associated with a configurable antenna according to embodiments of the invention.

FIG. 9A illustrates a data structure that may be stored in computer readable media 910 associated with a computing device using a configurable antenna according to embodiments of the invention. As illustrated in FIG. 9A, a data structure 920 is stored in computer readable media 910. Data structure 920 contains information that allows a specific wireless technology for which a radio may be configured to be mapped to control parameters for a configurable antenna the mapping may be defined to configure the antenna to be sensitive to signals having frequency characteristics to be passed as part of communications according to a particular wireless technology that may be specified for the radio.

In the example of FIG. 9A, data structure 920 includes multiple rows, such as rows 922A and 922B. Each of the rows creates a record in data structure 920 corresponds to a wireless technology. Each row such as 922A and 922B, maps a value identifying a particular wireless technology to control values that can configure an antenna to be sensitive to signals in the frequency range used by the identified wireless technology. For example, in row 922A, field $922A_1$ identifies a wireless technology "Wi-Fi." Field $922A_2$ identifies control parameters for a configurable antenna. In the example of FIG. 9A, field $922A_2$ contains a value "$S_1$ $S_2$." This value may configure an antenna to pass signals having a spectrum matching the spectrum used for WiFi communications. For example, when used in conjunction with a configurable antenna such as is illustrated in FIG. 8, the value "$S_1$ $S_2$" may indicate that RF switching transistors $822_1$ and $822_2$ should be placed in a closed state, but switching transistor $822_3$ should be placed in an open state. In this configuration, the configurable antenna may be sensitive to RF signals over the frequency range used to wirelessly communicate Wi-Fi signals.

The specific values of the parameters identified in field $922A_2$ may depend both on the wireless technology specified in field $922A_1$ and the characteristics of the configurable antenna in use. Any suitable mechanism may be used to determine the appropriate values of the parameters in field $922A_2$. The values may be determined empirically or may be determined computationally or in any other suitable way.

Continuing the example of FIG. 9A, data structure 920 is shown with a second row 922B. This row corresponds to a wireless technology identified in field $922B_1$, "WiMAX." In this case, field $922B_2$ contains a value "$S_1S_2S_3$," which may indicate an antenna configuration in which three RF switching transistors are closed to configure an antenna to pass signals that are used according to the WiMAX specification.

The wireless technologies for which a configurable antenna is to be configured may be identified in a data structure in any suitable way. In FIG. 9, wireless technologies are identified by name. However, any suitable identifier of a wireless technology may be used. A text string with the name of the wireless technology may be used as illustrated. As an alternative, a numeric code or other suitable identifier may be stored in a data structure, such as data structure 920, to indicate a specific wireless technology.

However, it is not necessary that a data structure storing antenna configuration information be indexed based on specific wireless technologies. For example, an antenna configuration may be stored in conjunction with each profile in profile store 250 (FIG. 2).

Figure 9B:
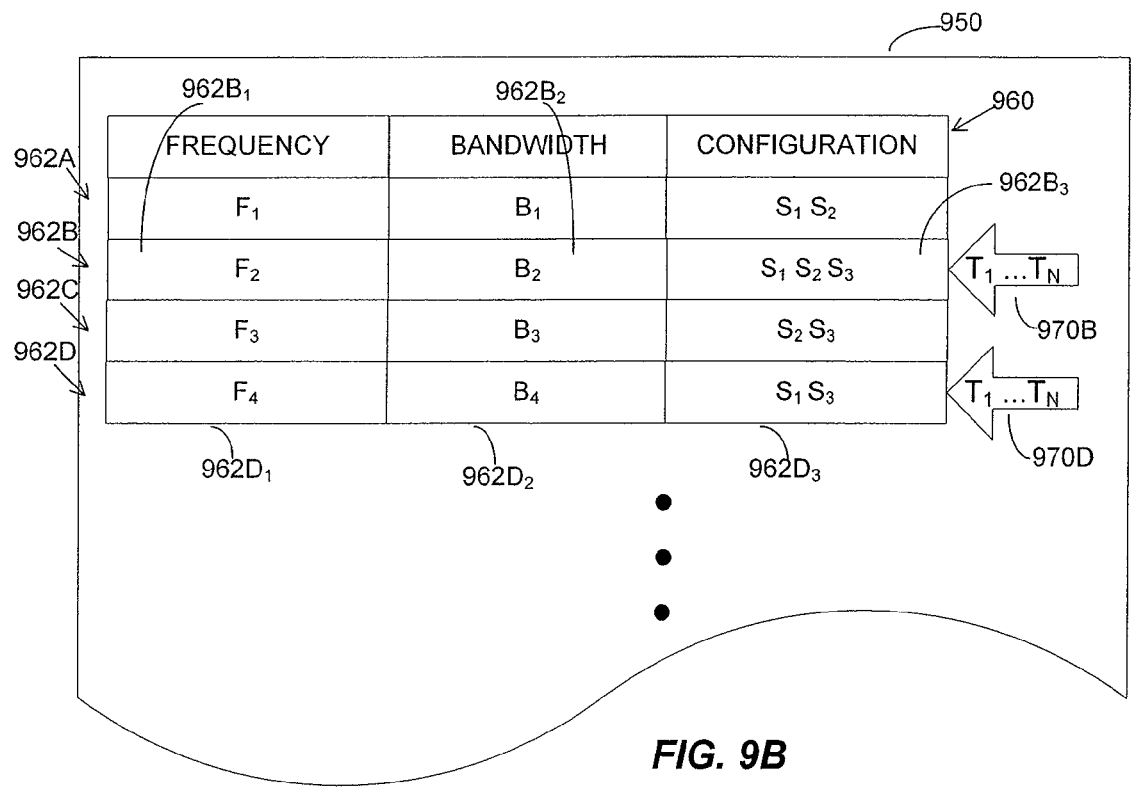

Further, it is not necessary that there be a one-to-one association between specifications for wireless technologies and antenna configurations. In some embodiments, control components associated with the configurable antenna may select appropriate antenna configurations based on operating conditions at the time. FIG. 9B shows an alternative embodiment of a data structure 960 that may be stored in a computer readable medium 950 associated with a computing device using a configurable antenna. In the example of FIG. 9B, data structure 960 is shown with multiple rows, each row corresponding to a different set of frequency characteristics. For simplicity, four rows 962A, 962B, 962C and 962D are shown. However, any number of rows may be included within data structure 960. Each of the rows represents a record in data structure 960 associating frequency parameters with control parameters for a configurable antenna. The control parameters stored in data structure 960 may be selected to configure a configurable antenna to be sensitive to signals having the associated frequency characteristics. In this example, the frequency characteristics are represented by a nominal frequency and a bandwidth. However, any other suitable representation of frequency characteristics may be used.

Taking row 962B as illustrative, the row contains fields 962B$_1$ and 962B$_2$, which contain information defining frequency characteristics. Associated with those frequency characteristics are values of control parameters in field 962B$_3$. The values in field 962B$_3$ may represent values applied to control inputs of a configurable antenna that will result in a configuration of the antenna that is sensitive to signals having frequency spectra that fall within a portion of the frequency spectrum defined by the values in fields 962B$_1$ and 962B$_2$.

In operation, control components in a computing device with a configurable antenna and a data structure 960, may, at any given time, receive an input identifying frequency characteristics of one or more signals to be transmitted. In response, the control components may identify a row in data structure 960 with frequency characteristics best matching the frequency characteristics of the signals to be processed. The control components may then use the values of the control parameters stored in association with those frequency characteristics to configure the configurable antenna.

In some instances, a signal to be transmitted will have frequency characteristics that exactly match frequency characteristics of one of the entries in data structure 960. In other instances, a signal to be transmitted may not have frequency characteristics exactly matching the frequency characteristics of the signal to be processed. In that case, the control components for the configurable antenna may employ an heuristic or other appropriate algorithm to identify the row in data structure 960 that best matches the frequency characteristics of the signal to be transmitted. As a specific example, the nominal frequency of the signal to be processed may not exactly match any of the frequencies listed in data structure 960. In that scenario, control components may select the row of data structure 960 for which the frequency characteristics define the smallest portion of the frequency spectrum that subsumes the frequency spectrum of the RF signal to be passed by the antenna. However, any suitable mechanism may be used to select a record from data structure 960 for each signal to be transmitted or received.

Furthermore, it is not necessary that the configurable antenna be configured to pass a single signal. In some instances, a software defined radio or other configurable radio may concurrently process signals associated with multiple wireless technology specifications. The software defined radio may be configured, at different times, to transmit or receive signals according to each of the wireless technology specifications. Data structure 960 may be adapted to store information indicating times at which each of the antenna configurations identified in data structure 960 is to be used. For example, time field 970B may be associated with row 962B. Time field 970B may store time values indicating times at which the configuration in field 962B$_3$ should be applied to a configurable antenna. Similarly, time field 970D may be used to store information indicating when the values in field 962D$_3$ should be applied to a configurable antenna.

Any suitable representation of times may be stored in time fields 970B and 970D. The times may, for example, indicate times relative to a common reference clock or other suitable measure of time. In such an embodiment, control components associated with configurable antenna could read antenna configuration information from data structure 960 at times indicated by the values in time fields, such as time fields 970B and 970D.

In an alternative embodiment, the values in time fields 970B and 970D could indicate only that at the present time the configurable radio may need to support transmission or reception of signals having characteristics in rows identified by time fields 970B and 970D.

Control circuitry could use this information in any suitable way. For example, the configuration circuitry could use the time information to vary the configuration of the antenna on a packet-by-packet basis, based on the frequency characteristics of each individual packet transmitted or received through the antenna. Alternatively, the control circuitry could use the information to select an antenna configuration that is on average most effective for all of the signals that could be passed. For example, if time fields 970B and 970D indicate that, at a given time, configurable radio may transmit a signal with characteristics indicated in fields 962B$_1$ and 962B$_2$ or could alternatively process a signal having frequency characteristics as described in fields 962D$_1$ and 962D$_2$, the control circuitry could compute an antenna configuration that supports signals having both frequency characteristics. In that scenario, the information in fields 962B$_3$ and 962D$_3$ could be combined to select an appropriate configuration.

For example, field 962B$_3$ contains a value "$S_1\ S_2\ S_3$" and field 962D$_3$ contains a value "$S_1\ S_3$." The separate configuration values associated with signals of different frequency characteristics may be determined in any suitable way. In the example, illustrated in FIG. 9B, a common set of control parameters may be selected, such that to support signals having frequency characteristics as identified in rows 962B and 962D, the configuration "$S_1\ S_3$" may be applied because $S_1$ and $S_2$ both appear in 962B$_3$ and 962D$_3$. Alternatively, the aggregate of the parameters may be specified. For example, the value "$S_1\ S_2\ S_3$" may be applied as the control values to the antenna, because this value represents the combination of the control values in fields 962B$_3$ and 962D$_3$.

In other embodiments, the control values may be ordered. As an example, the values "$S_1\ S_2\ S_3$" may represent the second configuration value while the value "$S_1\ S_3$" may represent the fourth value. These values may be ordered in proportion to the nominal frequency or other frequency characteristic that they support. Selecting an antenna configuration to support multiple wireless technology specifications simultaneously may involve taking the average frequency characteristics. In the embodiment illustrated in FIG. 9B where the second and fourth antenna configurations are to be used simultaneously, the configurable antenna, rather than being configured for the second or the fourth, may be configured for the third because that value would represent an average of the second and the fourth. In this example, the control values $S_2$ $S_3$ may correspond to the third wireless configuration and may be applied to control configurable antenna when both the second and fourth configurations are to be used concurrently without reconfiguring the programmable antenna. Such an average configuration may, for example, have a nominal frequency that is the average of the nominal frequencies associated with the second and fourth configurations. Alternatively or additionally, the bandwidth associated with such a configuration may encompass spectral components that are present in both the second and fourth configuration and one half of the spectral components of each of the second and fourth configuration that do not overlap. However, any suitable way may be used to determine an antenna configuration providing an average of the antenna configurations used to support signals having two or more different frequency characteristics.

In some embodiments, it is not necessary to determine an antenna configuration that simultaneously supports signals of different frequency characteristics. For example, in a software defined radio as illustrated in FIG. 2, the radio, including the configurable antenna, may be reconfigured on a packet by packet basis. Accordingly, each transmission and each reception may use an antenna configured for the frequency characteristics of the signals used to wireless convey the packet information. A process of operating a computing device with such a radio is illustrated in FIG. 10.

Figure 10:
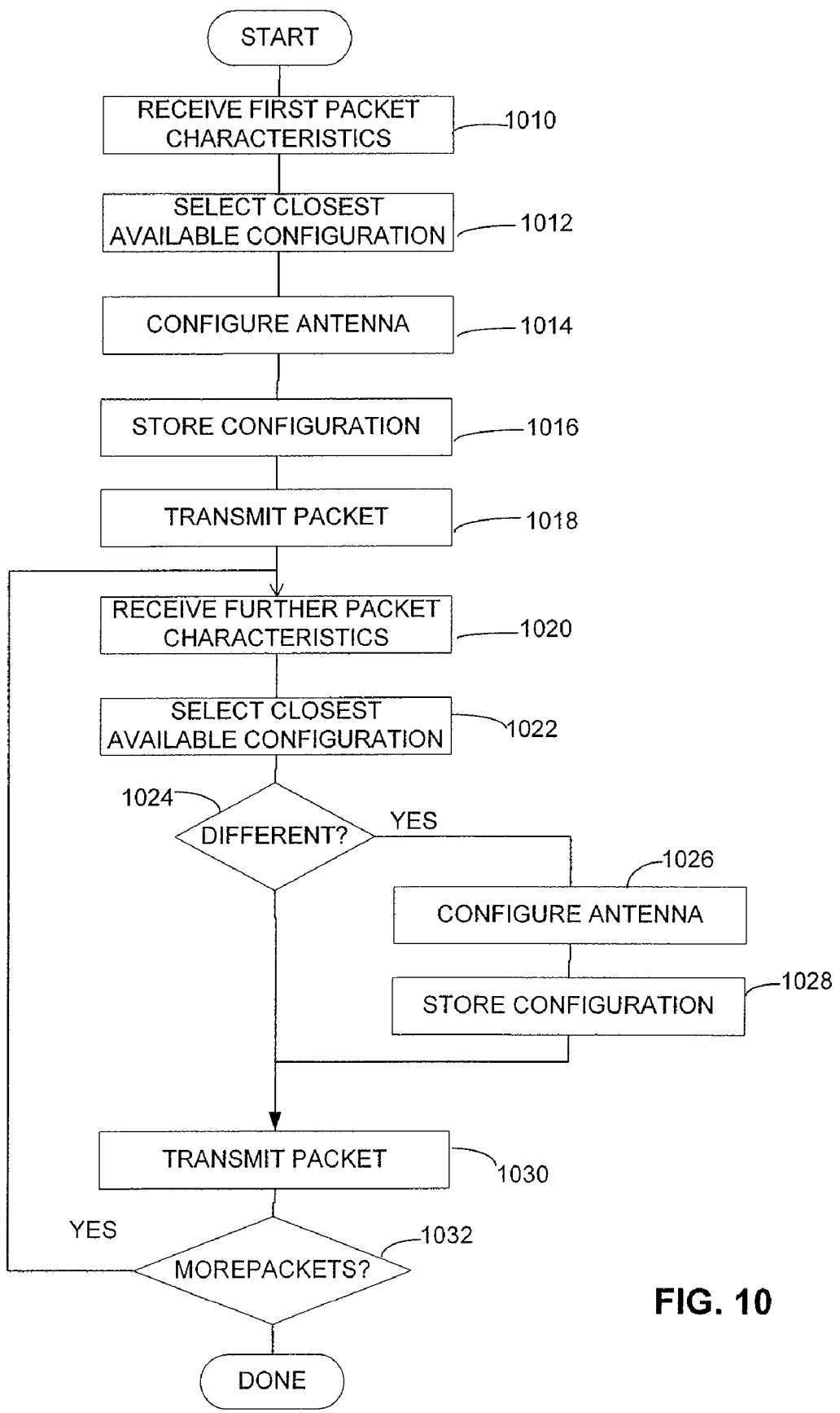
FIG. 10 is a flowchart of a process of operating a radio with a configurable antenna according to embodiments of the invention.

The process of FIG. 10 begins at block 1010. At block 1010, characteristics for a first packet are received. The characteristics may be received in any suitable way. In a software defined radio as illustrated in FIG. 2, configuration logic 242 may communicate configuration information to each of the modules within the software defined radios including those that control antenna configuration. Configuration logic 242 may provide hardware configuration and control module 280 with information defining frequency characteristics of the signals used to communicate the first packet. The characteristics may be communicated in any suitable way. For example, as illustrated in FIG. 9A, the characteristics may be communicated by identifying a wireless technology to be used for processing the packet. FIG. 9B illustrates that alternative methods for communicating packet characteristics are possible. In FIG. 9B, a nominal frequency and band width are used to define packet characteristics relevant to configuring an antenna.

Regardless of the form of information defining the packet characteristics and the specific component within a computing system that uses the defined characteristics to configure the antenna, the process of FIG. 10 proceeds to block 1012. At block 1012 the processing element that received the packet characteristics may select the closest available antenna configuration to support a packet having the characteristics received at block 1010. The selection at block 1012 may be made in any suitable way. Examples of a manner in which an antenna configuration may be selected or described above in connection with FIGS. 9A and 9B. Those examples indicate that an antenna configuration may be selected by directly mapping packet characteristics to an antenna configuration or by selecting antenna characteristics that support a frequency spectrum that encompasses or is otherwise related to the frequency spectrum of the RF signal used to wirelessly communicate the packet.

Regardless of how the antenna configuration is selected, the process proceeds to block 1014. At block 1014, the selected configuration is applied to a configurable antenna. FIGS. 6, 7 and 8 provide examples of mechanisms that may be used to configure an antenna. However, any suitable mechanism may be used to configure the antenna.

The process then proceeds to block 1016. At block 1016, the applied antenna configuration is stored. The configuration may be stored in any suitable way. In the example of FIG. 9B, time values such as 970B or 970D may be recorded in a data structure to indicate that a specific antenna configuration is in use. However, the specific mechanism by which the configuration is stored is not critical to the invention and any suitable mechanism may be used. At block 1018, the radio, with the antenna configured for the first packet, transmits the packet. Because the packet is radiated through an antenna with a configuration selected to efficiently radiate RF signals having frequency characteristics that match the characteristics of the RF signal used to wireless communicate the packet, the transmission at block 1018 may be efficient. Similar efficiency is achieved when the antenna is configured to selectively pass RF signals having frequency characteristics that match the frequency characteristics of an RF signal used to wirelessly communicate a packet to be received at a radio with a configurable antenna. Though FIG. 10 shows only configuration for transmit packets, it should be appreciated that a corresponding process may be performed to configure the antenna on a packet by packet basis to efficiently receive packets.

Once the first packet is transmitted at block 1018, the process may continue to block 1020, where further at block 1020, characteristics of a further packet may be received. At block 1022, the closest available antenna configuration may be selected based on the characteristics received at block 1020. The processing at blocks 1020 and 1022 may be the same as that performed at blocks 1010 and 1012 on the first packet. However, the packet processing may be performed by any suitable component in any suitable way.

Regardless of how the antenna configuration is selected at block 1022, the process proceeds to decision block 1024. At decision block 1024, the process branches, depending on whether the configuration selected at block 1022 is the same as the configuration previously stored. If the configurations are the same, processing proceeds to block 1030, where the packet is transmitted without changes to the antenna configuration. However, if the configuration selected at block 1022 is different then the previously stored configuration, the process branches from decision block 1024 to block 1026. At block 1026, the antenna is reconfigured based on the configuration selected at block 1022. At block 1028, that configuration is stored. The configuration stored at block 1028 may replace a previously stored configuration. However, information about the antenna configuration may be stored in any suitable way.

If the antenna is reconfigured for a packet, the process proceeds from block 1028 to block 1030. At block 1030, the packet is transmitted, using the reconfigured antenna.

The process then proceeds to decision block 1032. At decision block 1032, the process branches, depending on whether further packets remain for transmission. If no further packets remain, the process terminates. Alternatively, if more packets remain for transmission, the process branches from decision block 1032 and loops back to block 1020. At block 1020, characteristics of a further packet may be received.

The process may proceed iteratively in this fashion, with frequency characteristics of each packet being received for use in configuring the antenna for selectively passing signals having frequency characteristics matching those used to communicate the packet. In this way, the antenna may be configured on a packet-by-packet basis, allowing the antenna to be configured to efficiently pass signals communicating information according to different wireless technologies.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device with a configurable antenna and a configurable radio, the method comprising:

establishing a network connection on behalf of an application;

based on the first wireless technology specification, configuring the radio to operate according to a first wireless technology using a frequency spectrum having a nominal frequency and a bandwidth around the nominal frequency;

based on the first wireless technology specification, configuring the antenna to selectively transmit and/or receive signals having the nominal frequency and the bandwidth;

reconfiguring the radio and the antenna to operate according to a second wireless technology; and passing first and second signals of the network connection via the antenna configured according to the first and second wireless technologies, respectively, wherein, during the reconfiguring of the antenna and the passing of the first and second signals of the network connection via the antenna configured according to the first and second wireless technologies, respectively, the network connection is maintained and connection information corresponding to the network connection is unchanged.

2. The method of claim 1, wherein:
the wireless technology specification comprises an identification of the wireless technology;
configuring the antenna comprises mapping the identified wireless technology to one or more antenna control values; and
configuring the antenna comprises applying the antenna control values.

3. The method of claim 1, wherein the reconfiguring occurs during a communication session using the first wireless technology and the second wireless technology.

4. The method of claim 3, wherein the reconfiguring occurs on a packet-by-packet basis.

5. The method of claim 1, wherein the reconfiguring comprises retrieving antenna control parameters associated with the second wireless technology from a data structure on the computing device, the data structure providing a mapping between each of a plurality of wireless technologies and values of antenna control parameters.

6. A computing device, comprising:
a configurable antenna having an input/output port adapted to pass a signal and control inputs;
a computer storage media having stored thereon a data structure comprising a plurality of records, each record comprising:
a first field containing data representing parameters of the signal, and
a second field containing data representing a configuration of the antenna; and
a control component configured to access the data structure based on the parameters of the signal, obtain configuration data representing the configuration of the antenna and apply values to the control inputs of the antenna based on the obtained configuration data,
wherein the computer storage media further has stored thereon computer-executable instructions for, when executed:
receiving a specification of the signal, the specification not corresponding to any record in the data structure;
selecting from the data structure a first record that best matches frequency characteristics of the specification, based on an heuristic; and
applying to the configurable antenna control signals derived from the first record.

7. The computing device of claim 6, wherein the data contained in the first field comprises an identifier of a wireless technology according to which the signal is to be generated.

8. The computing device of claim 6, wherein the data contained in the first field comprises frequency parameters of the signal.

9. The computing device of claim 8, wherein the frequency parameters comprise a nominal frequency and a bandwidth around the nominal frequency.

10. The computing device of claim 6, wherein the computer storage media further comprises computer-executable instructions, when executed, for:
receiving a specification of the signal;
selecting from the data structure a record corresponding to the specification; and
applying to the configurable antenna control signals derived from the data in the second field of the selected record.

11. The computing device of claim 10, wherein:
receiving a specification of the signal comprises receiving a first specification and a second specification; and
selecting a record from the data structure comprises selecting a first record and a second record.

12. The computing device of claim 11, wherein the computer-executable instructions, when executed, are further for:
deriving the control signals by combining data from the second fields of the first record and the second record.

13. The computing device of claim 6, wherein the record that best matches the frequency characteristics of the specification is the record having frequency characteristics which define a smallest portion of a first frequency spectrum that subsumes a second frequency spectrum of the specification of the signal.

14. The computing device of claim 6, wherein the computer storage media further has stored thereon computer-executable instructions for, when executed:
receiving specifications of at least two signals;
selecting from the data structure a second record having a nominal frequency that is an average of the nominal frequencies associated with the at least two signals; and
apply to the configurable antenna control signals derived from the second record.

15. One or more computer storage media having stored thereon computer-executable instructions for, when executed on a computing device having a configurable antenna:
identifying a frequency characteristic of a signal;
selecting an antenna configuration, from a plurality of antenna configurations corresponding to a respective plurality of antenna frequency characteristics that do not match the frequency characteristic of the signal, the selected antenna configuration corresponding to an antenna frequency characteristic that approximate the frequency characteristic of the signal; and
configuring the configurable antenna in accordance with the selected antenna configuration.

16. The one or more computer storage media of claim 15, further having stored thereon computer-executable instructions for, when executed, controlling a software defined radio coupled to the configurable antenna to send or receive the signal.

17. The one or more computer storage media of claim 15, wherein:
the frequency characteristic of the signal comprises a signal bandwidth;
the plurality of antenna frequency characteristics comprises a plurality of antenna bandwidths; and selecting the antenna configuration comprises identifying, among the plurality of antenna bandwidths, an antenna bandwidth covering a smallest portion of frequency spectrum that subsumes the signal bandwidth, and selecting the antenna configuration that corresponds to the identified antenna bandwidth.

18. The one or more computer storage media of claim 15, further having stored thereon computer-executable instructions for, when executed, identifying a second frequency characteristic of a second signal, the frequency characteristic and the second frequency characteristic comprising a nominal frequency and a second nominal frequency, respectively;

selecting a second antenna configuration having a nominal antenna frequency that is an average of the first and second nominal frequencies; and reconfiguring the configurable antenna in accordance with the second antenna configuration.

19. The one or more computer storage media of claim 15, wherein configuring the configurable antenna in accordance with the selected antenna configuration comprises sending signals to control inputs of an adjustable load attached to the configurable antenna.

* * * * *